United States Patent [19]

Ruzga et al.

[11] Patent Number: 5,408,509
[45] Date of Patent: Apr. 18, 1995

[54] AUTOMATIC PRESSURE VESSEL SERVICING APPARATUS

[76] Inventors: Frank Ruzga, 1201 N. Stream Pkwy., Point Pleasant, N.J. 08742; Bill Biach, 17 E. North Ave., Cranford, N.J. 07016; Joe Orban, 12 Greensview Dr., South Plains, N.J. 07076

[21] Appl. No.: 128,490

[22] Filed: Sep. 28, 1993

Related U.S. Application Data

[62] Division of Ser. No. 615,785, Nov. 9, 1990, Pat. No. 5,249,208.

[51] Int. Cl.6 ............................................. G21C 19/00
[52] U.S. Cl. ..................... 376/260; 376/245; 81/57.38
[58] Field of Search ................. 376/245, 260, 261; 81/53.2, 57.38, 57.35

[56] References Cited

U.S. PATENT DOCUMENTS

| | | | |
|---|---|---|---|
| 4,226,451 | 5/1981 | Boudet et al. | 81/57.35 |
| 4,548,103 | 10/1985 | Orban | 81/53.2 |
| 4,552,038 | 11/1985 | Heiermann et al. | 81/57.38 |
| 5,249,208 | 9/1993 | Ruzga et al. | 376/260 |

Primary Examiner—Donald P. Walsh
Assistant Examiner—Frederick H. Voss
Attorney, Agent, or Firm—Weingram & Zall

[57] ABSTRACT

A method and apparatus for positioning stud affecting apparatus comprising: sequentially positioning a plurality of flange cover sectors about the flange of a nuclear pressure vessel; rotating each flange cover sector until the entire flange is covered by said flange cover sectors; moving a caddy containing stud affecting tools including stud tensioners and stud drive tools into a position adjacent a point on the flange of the nuclear reactor pressure vessel; moving apparatus sector vessels containing stud affecting apparatus to a point on the flange of the nuclear pressure vessel and positioning them on a specific flange cover sector; rotating all flange cover sectors to bring another flange cover sector into registration with the caddy; sequentially moving the apparatus sectors onto each flange cover sector by rotating the flange cover sectors; and actuating the stud affecting tools to perform the appropriate function to tension or untension the studs and/or to remove and/or to insert studs into the pressure vessel to enable removal of the dome and servicing of the nuclear pressure vessel.

10 Claims, 21 Drawing Sheets

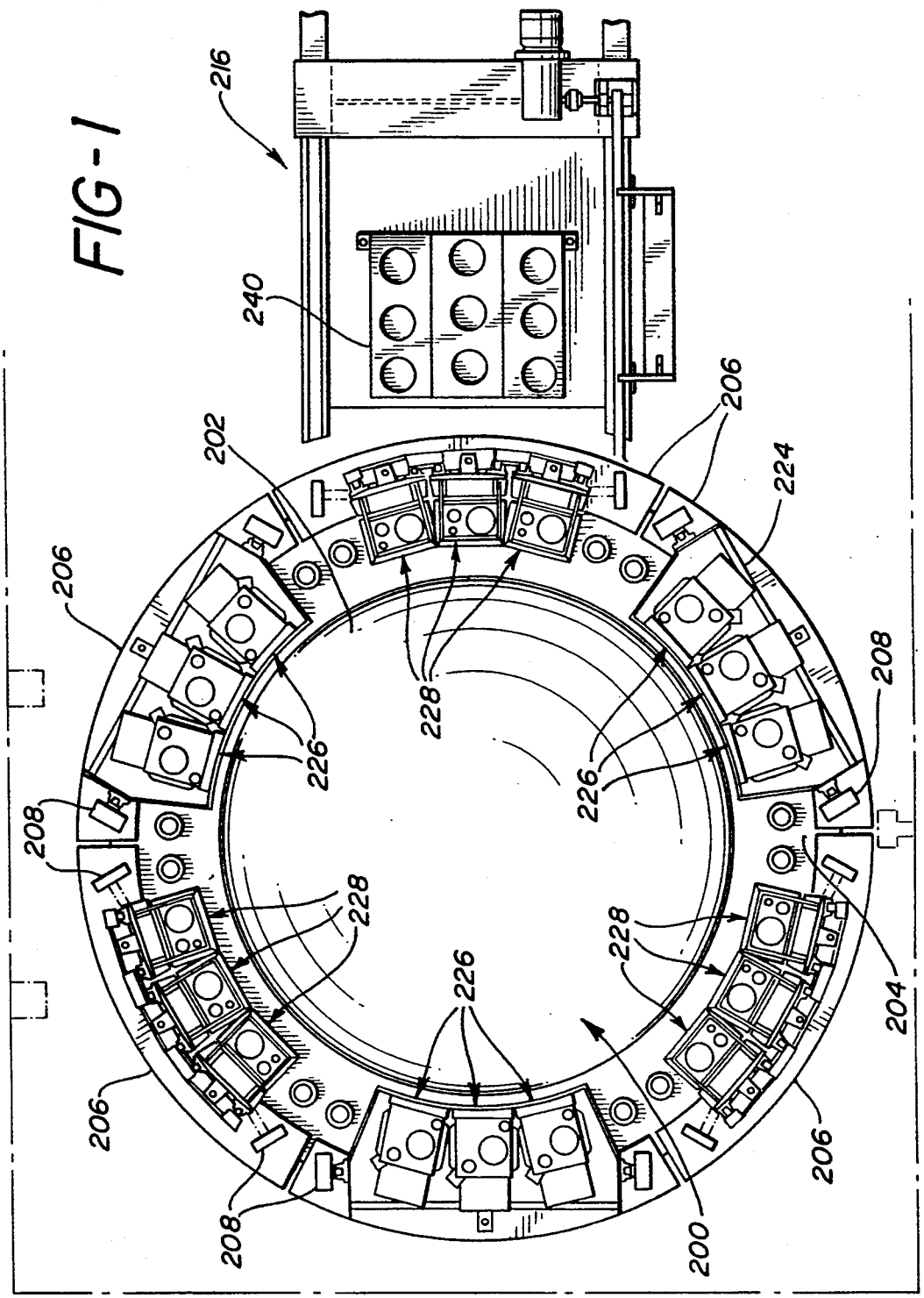

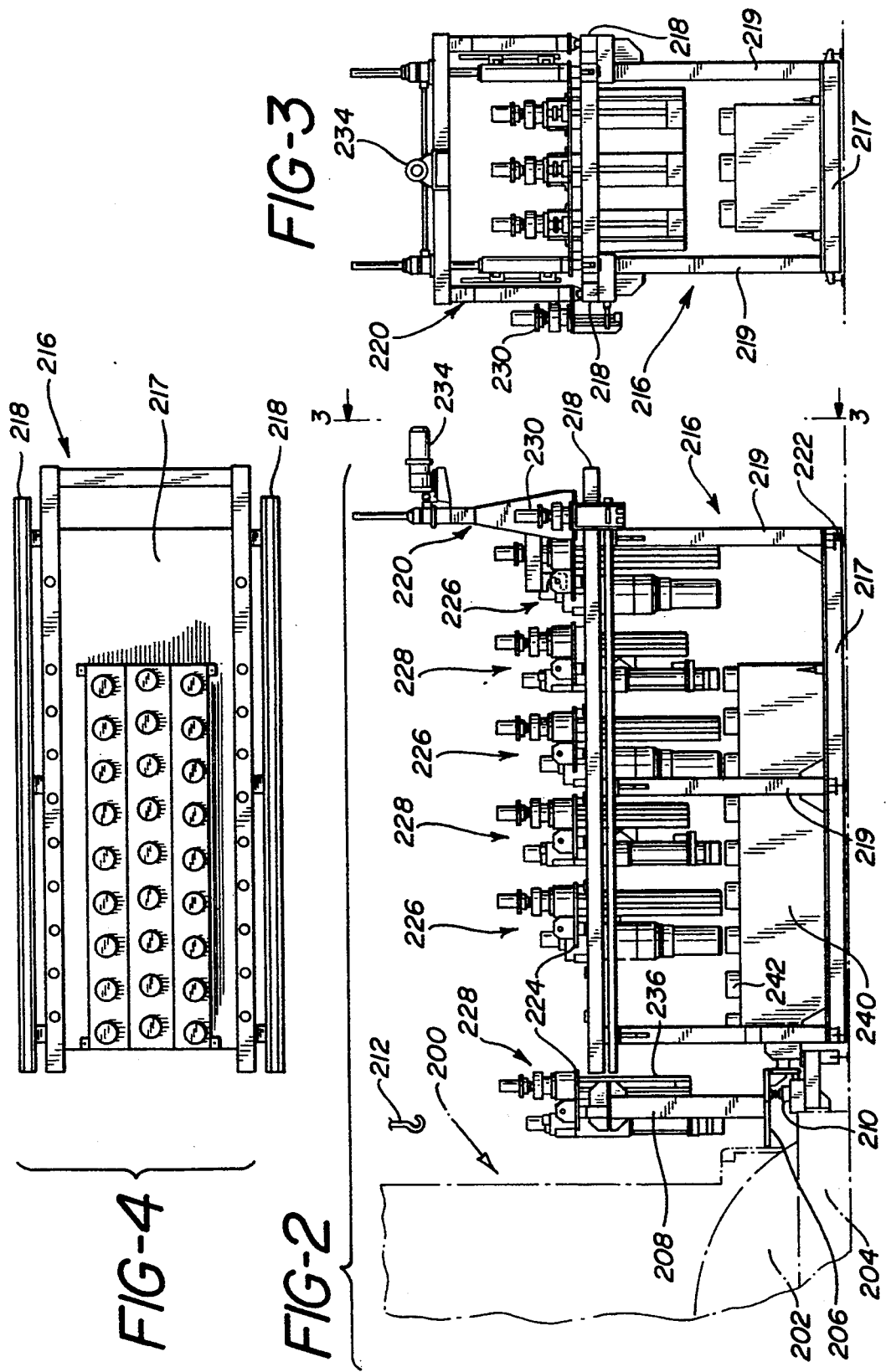

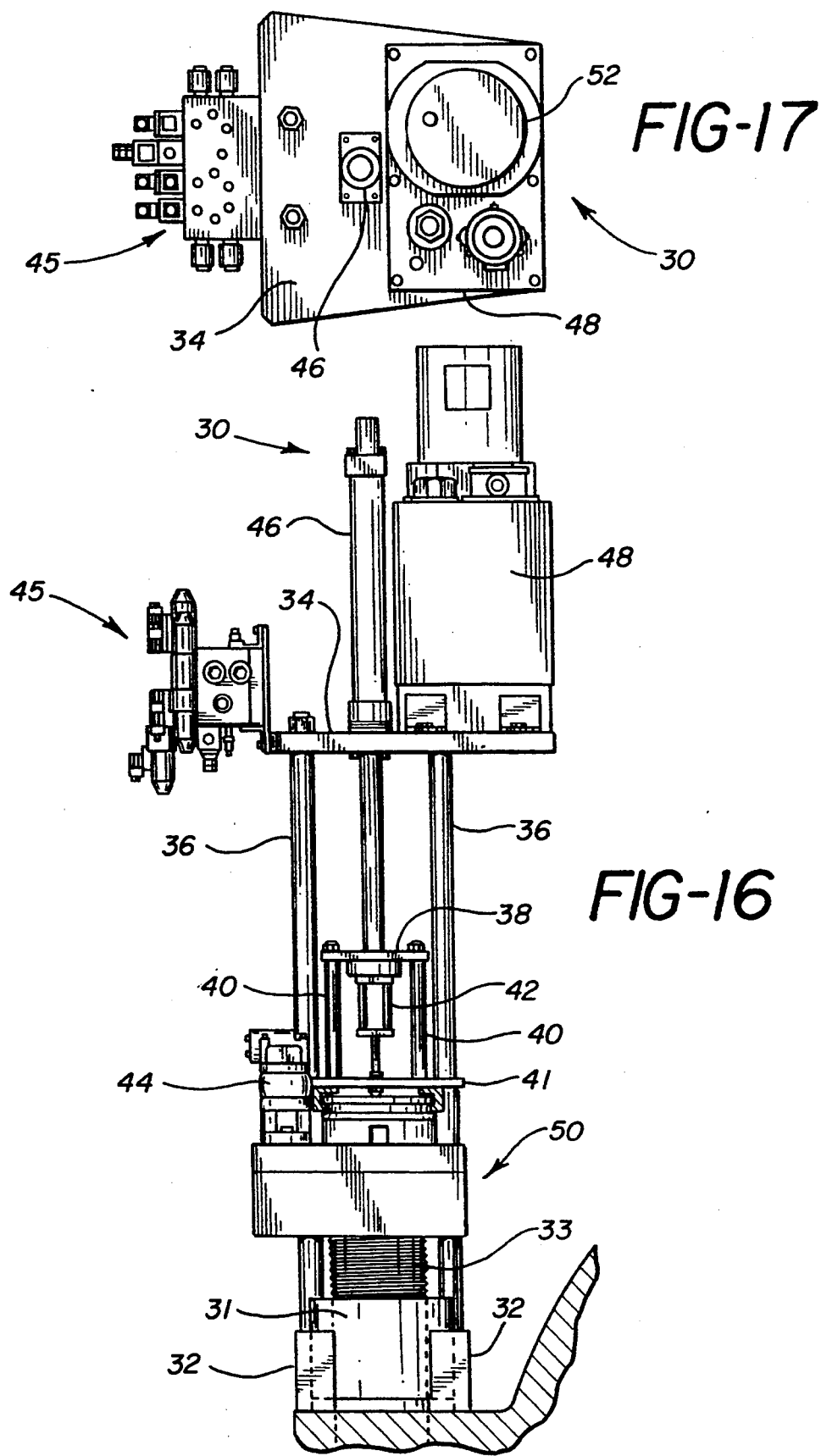

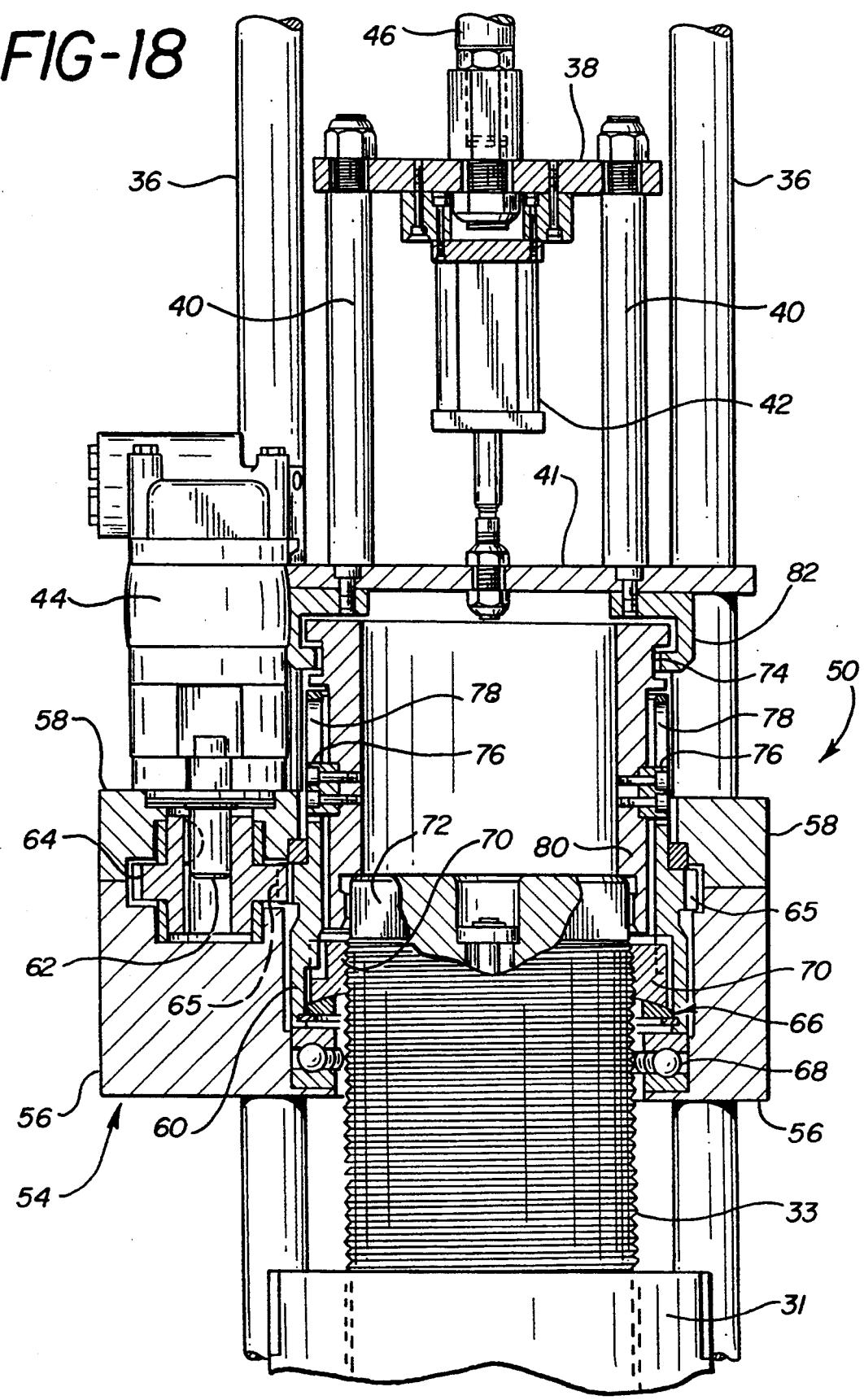

AUTOMATIC PRESSURE VESSEL SERVICING APPARATUS

This is a divisional of application Ser. No. 07/615,785 filed on Nov. 9, 1990 now U.S. Pat. No. 5,249,208.

BACKGROUND OF THE INVENTION

FIELD OF THE INVENTION

This invention relates to stud tensioning devices and stud insertion and removal devices and more particularly to devices intended for automatically inserting, removing and tensioning large studs, used in nuclear reactor pressure vessels, with a minimum, if any, of human intervention.

SUMMARY OF THE INVENTION

Accordingly, the present invention sets forth apparatus for automatically and remotely positioning stud affecting apparatus including stud tensioners and stud insertion and removal tools over flange cover sectors, so that the stud affecting tools can be operated remotely to service nuclear reactor pressure vessels or other vessels amenable to such applications, e.g. space stations.

The apparatus includes a plurality of flange cover sectors disposable about a flange and a caddy carrying apparatus sectors of stud tensioners and stud drive tools, which caddy has a gantry to automatically deliver the apparatus sectors to a position about the flange where they can be mounted on flange cover sectors which can then be rotated around so the entire flange can be covered with flange cover sectors on which are mounted stud affecting apparatus to remotely and automatically perform the operations necessary for removal of the flange.

The field of nuclear power generation has long required the use of tools for servicing nuclear reactors contained within pressure vessels. In order to minimize hazards to workers, it is desirable to minimize the amount of time that workers are required to work around and opened pressure vessel for a nuclear reactor and be subject to the hazards of radioactive poisoning and/or contamination.

The present invention sets forth an automated apparatus to insert and remove studs and tension studs on flanges with a minimum of human intervention. The apparatus comprises a series of fluid powered cylinders and includes stud tensioners and stud insertion and removal tools supported above a stud extending from a flange. The fluid system for the stud insertion and removal tool includes a drive motor which actuates a stud gripping mechanism which automatically, threadably engages the threaded portion of the top of a stud. When threaded engagement is achieved, the fluid system provides a means for engaging a second mechanism, a drive coupling, which engages a mating means on the top of the stud to enable the entire stud and drive coupling to be rotated along with the gripping means, as a single unit, to rotate the stud for either removing or inserting the stud within the pressure vessel. Means are provided which automatically engage and disengage the drive coupling and the gripping coupling in appropriate sequence. Additionally, fluid means are provided in order to maintain the weight of the tool suspended above the coupling to prevent undue bearing loads on the threaded portions and mating portions of the stud.

Also, included in the present invention is an automated apparatus for tensioning studs. The apparatus comprises a housing having several units, each unit having a piston. Also included is a puller bar which is threadably attachable to a stud. After attachment of the puller bar to the stud, the pistons are hydraulically extended to elongate the stud to permit automatic tightening down or backing off of a nut by a drive gear means. The apparatus further comprises a plurality of sensors which sense the relative positions of the nut with respect to the stud and the elongation of the stud.

Accordingly, it is desirable to provide equipment which can do as much as possible of the work necessary for servicing flanges, such as for opening and closing the pressure vessels for nuclear reactors.

It is a further object of the present invention to provide an apparatus for enabling the remote servicing by opening and closing of a flange by means of stud tensioners and stud insertion and removal tools.

Another object of the invention is to provide a method and apparatus that enables utilization of several remote stud tensioners and drivers separably or simultaneously without human presence at the site of operation.

It is still a further object of this invention to provide service to a flange without risk of exposure of contamination to humans.

It is yet another object of this invention to provide an apparatus which can operate in relatively confined spaces.

Accordingly, it is an object of the present invention to provide an apparatus for effectively inserting and removing studs.

A further object of the invention is to provide a self contained stud tensioner having automated apparatus for tensioning and detensioning studs.

Another object of the invention is for working in cooperation with various other equipment for automatic servicing of nuclear reactor pressure vessels.

Yet another object of the invention is for operating with minimal intervention of human beings.

Another object of the invention is for working with a minimum of human control, in an environment which is relatively small and with equipment which can operate in connection with several other pieces of equipment for servicing of flanges.

Still another object of the invention includes an accurate and effective method of automatically and remotely measuring the strain or elongation in a stud.

A further object of the invention is to automatically measure the strain or elongation in a stud and to use such information to control the tensioning of a stud.

Another object of the invention includes providing numerous sensors to remotely monitor the performance of various apparatus incorporated into the stud tensioner.

Still another object of this invention is that it includes a self contained stud tensioner having remotely driven means for rotating or driving the nut on a stud, and for engaging and disengaging the tensioner from the stud so that hydraulic pistons can be automatically actuated to axially load the stud to allow for tensioning and detensioning of the stud and tightening and loosening of the nut.

Another object of this invention is to provide an apparatus for inserting and removing studs which can be operated with a minimum of human intervention.

Still another object of this invention is to provide an apparatus for inserting and removing studs which does not require extended human participation in the process of inserting and removing studs.

Yet another object of this invention is to provide an apparatus for inserting and removing studs in pressure vessels which does not produce undue wear on the flange or stud threads from insertion or removal.

It is even another object of this invention is to provide a relatively small apparatus for inserting and removing studs.

An even further object of this invention is to provide an apparatus for inserting and removing studs which is relatively simple to operate.

It is also an object of this invention is to provide an apparatus for inserting and removing studs which is relatively reliable.

Still another object of this invention is to provide a relatively durable apparatus for inserting and removing studs.

Yet another object of this invention is to provide a self-contained apparatus for inserting and removing studs in pressure vessels.

Even another object of this invention is to provide an apparatus for inserting and removing studs in pressure vessels which can be operated in sequencing procedures with other similar tools and/or with tools for tensioning the entire stud.

Other objects and advantages will be apparent from the description of the illustrated embodiment of the invention, and the novel features will be particularly pointed out hereinafter in the claims.

BRIEF DESCRIPTION OF THE FIGURES

FIG. 1 is a top schematic view of a nuclear reactor pressure vessel with a servicing ring positioned on top of the vessel flange and with a carrier for stud tensioners in position.

FIG. 2 is a side elevation of the carrier for the servicing apparatus shown in FIG. 1 with stud tensioners and stud drive tools positioned for eventual placement on the nuclear pressure vessel.

FIG. 3 is a view taken along line 3—3 of FIG. 2.

FIG. 4 is a top schematic view of the equipment shown in FIG. 2.

FIG. 16 shows a schematic rendering of a stud drive tool in place over a stud positioned on a nuclear reactor pressure vessel.

FIG. 17 is a top view of the device shown in FIG. 16.

FIG. 18 is an enlarged partial side view of the section of the stud drive mechanism engaged with the top of the stud.

DETAILED DESCRIPTION OF THE INVENTION

Figure 6:
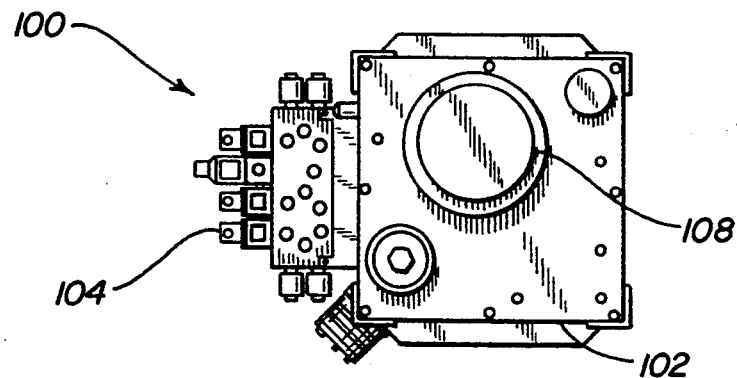
FIG. 6 is a top view of the apparatus shown in FIG. 5.
Figure 5:
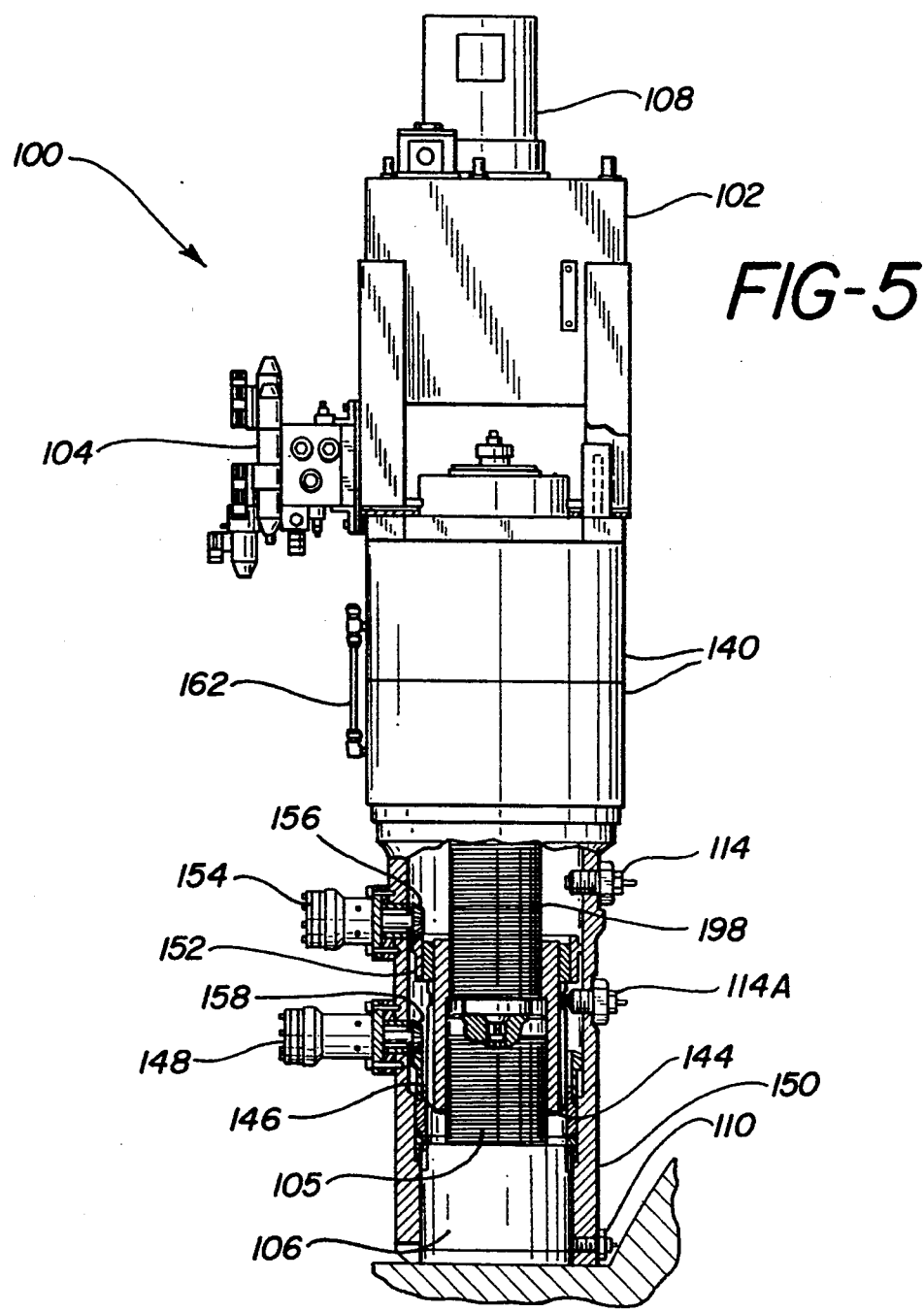
FIG. 5 is a partially broken away side view of a stud tensioner carried by the equipment shown in FIGS. 2 and 3.
Figure 7:
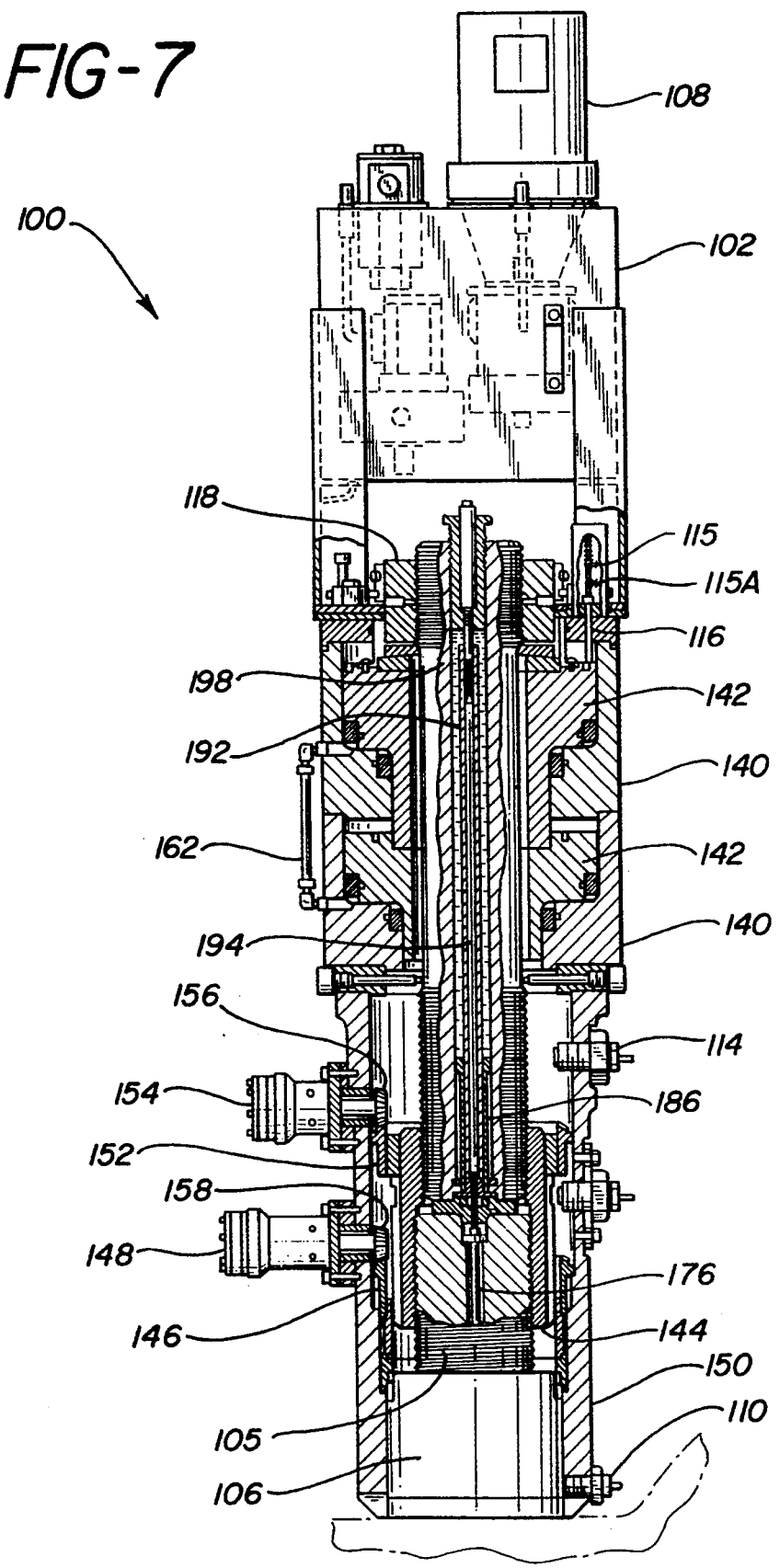
FIG. 7 is a partial sectional view of the stud tensioner shown in FIG. 5.
Figure 8:
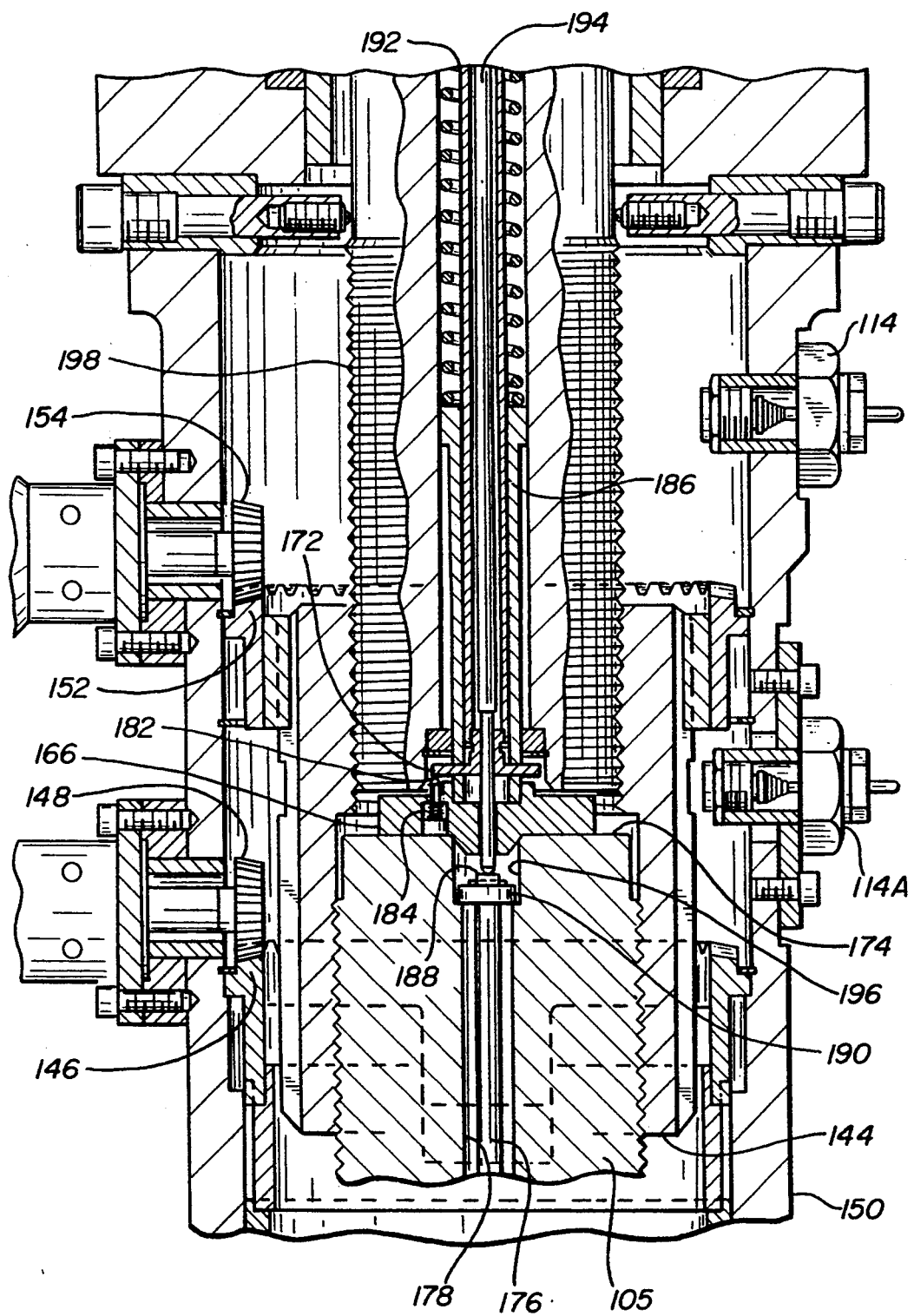
FIG. 8 is an enlarged partially broken away view of the stud tensioner showing the juncture of the puller bar and the top of the stud.
Figure 9:
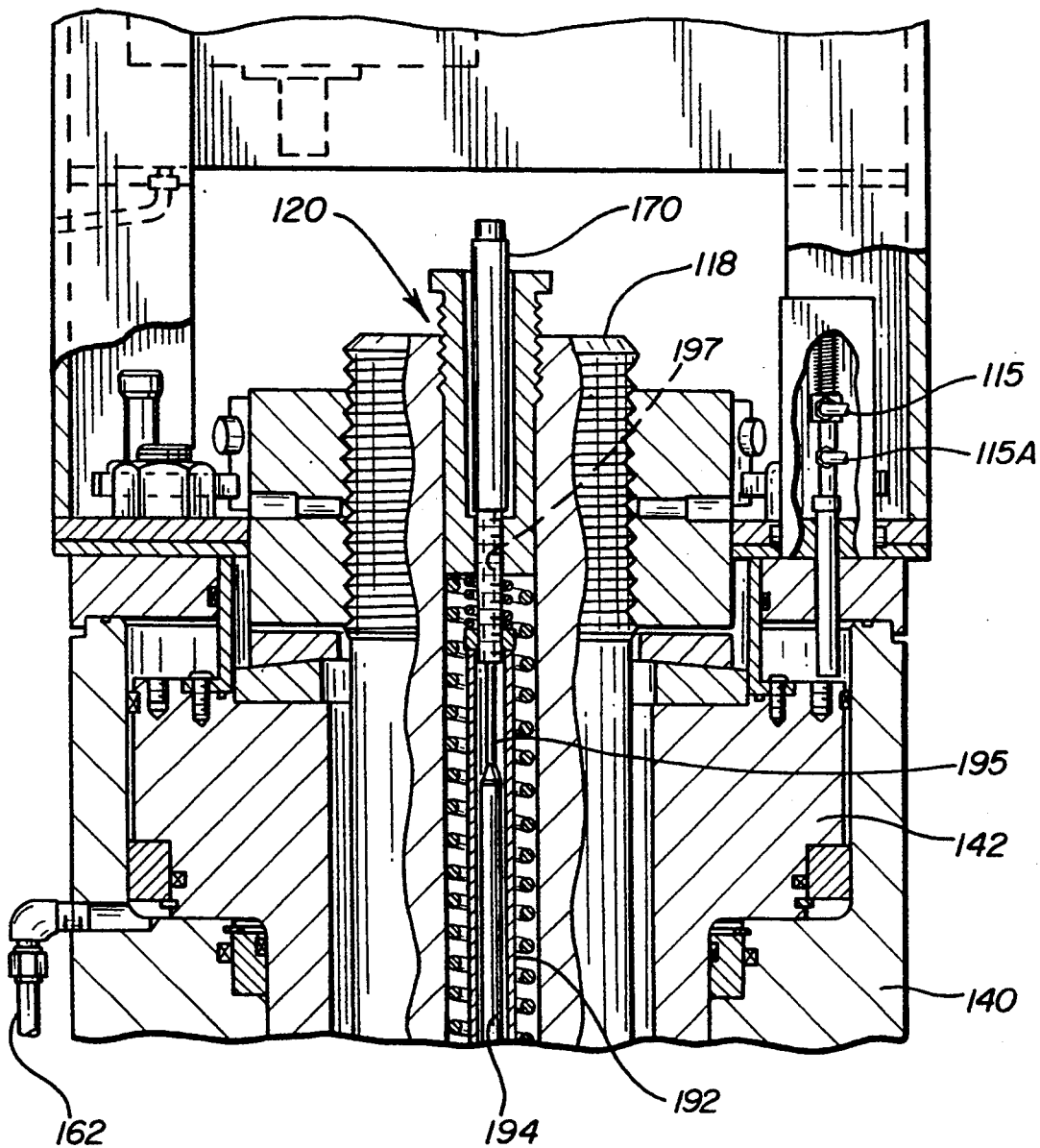
FIG. 9 is a partially broken away view of the tensioner shown in FIG. 6 showing the end of the puller bar and the elongation measuring system.
Figure 10:
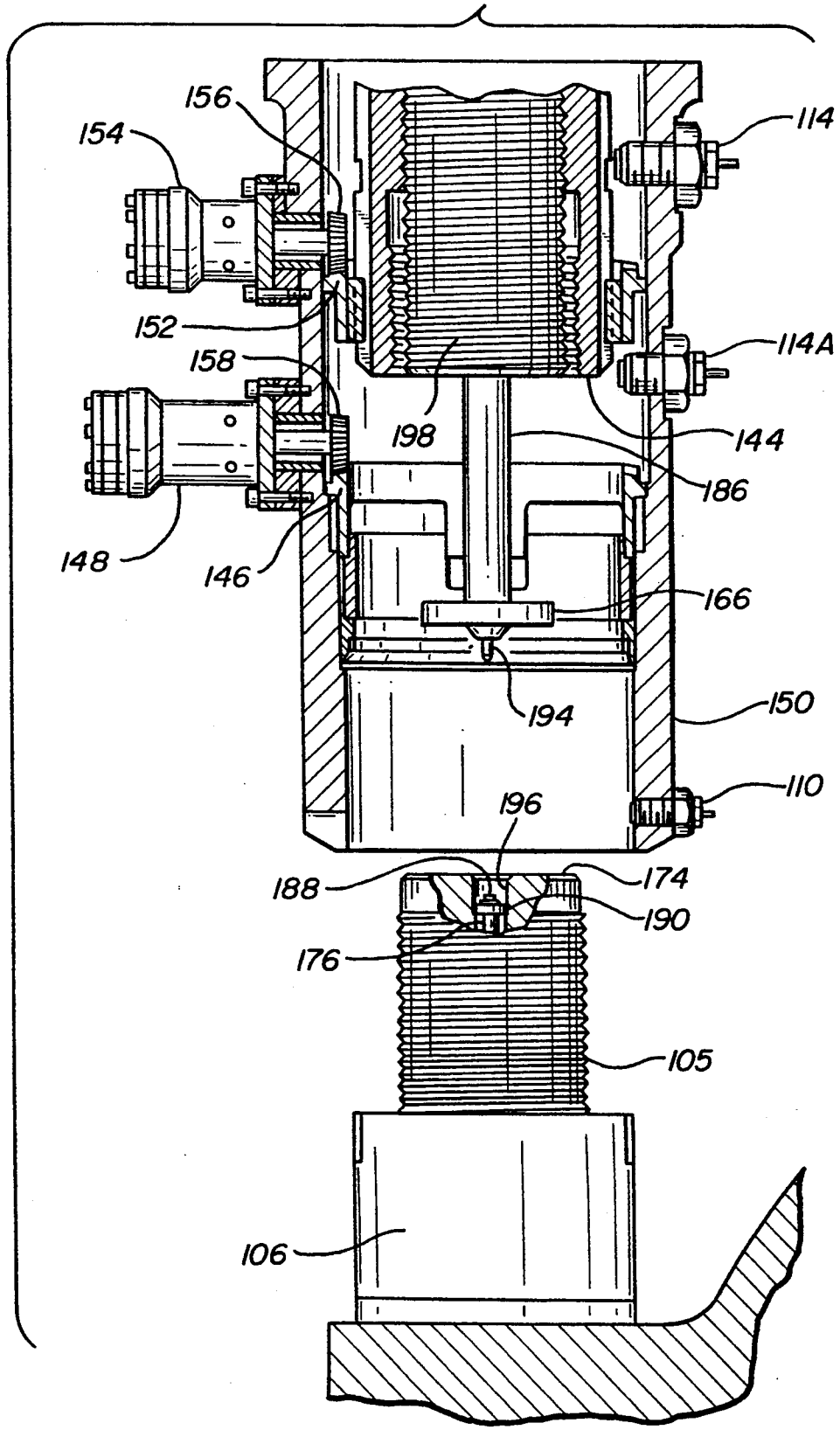
FIG. 10 is a schematic view showing sequence 1 of the tension engagement with the tensioner positioned above the stud.
Figure 11:
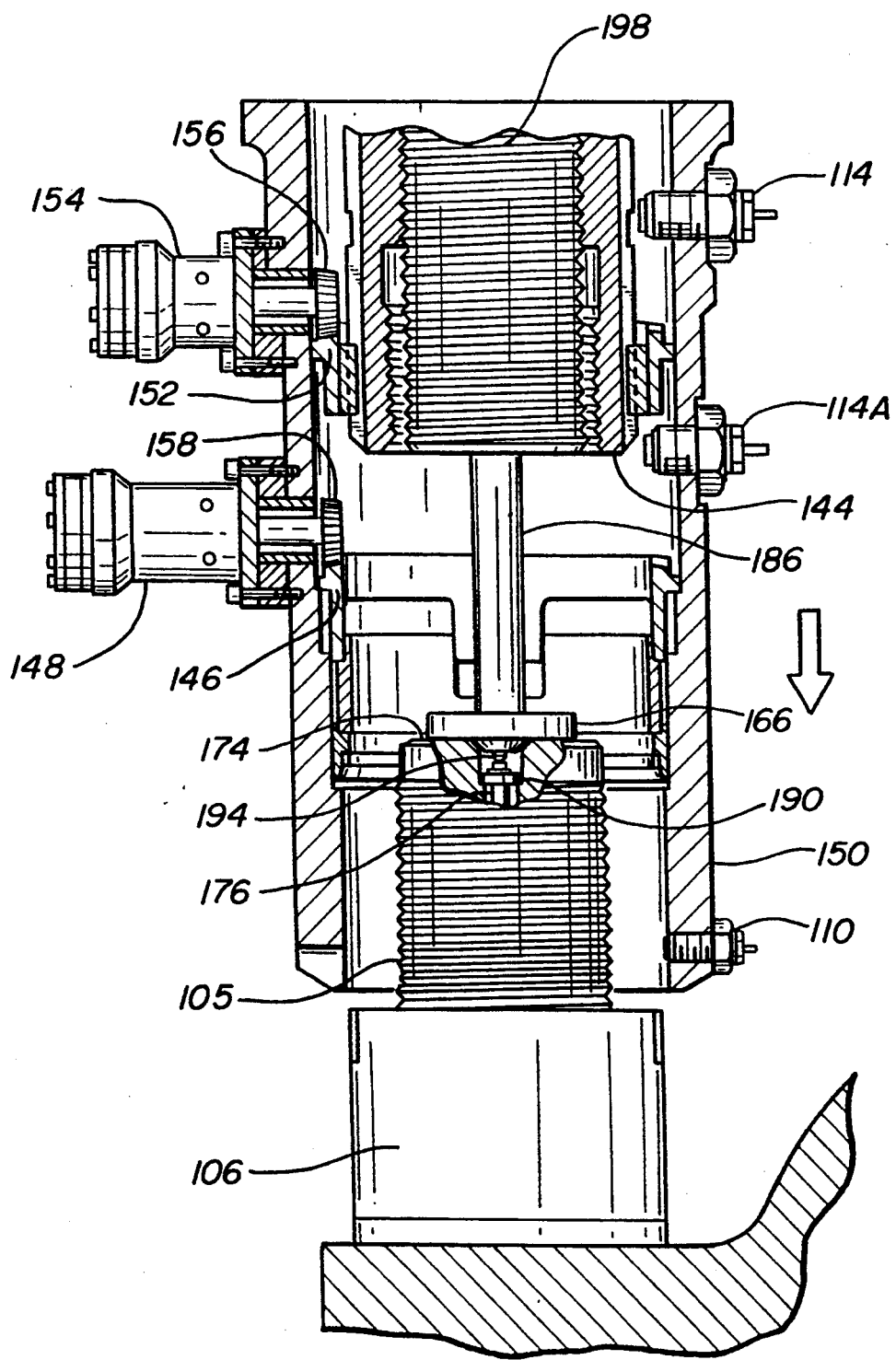
FIG. 11 is a view of sequence 2 of the tension engagement showing the tensioner being lowered over the stud and the nut, with the centering device in engagement with the top of the stud.
Figure 12:
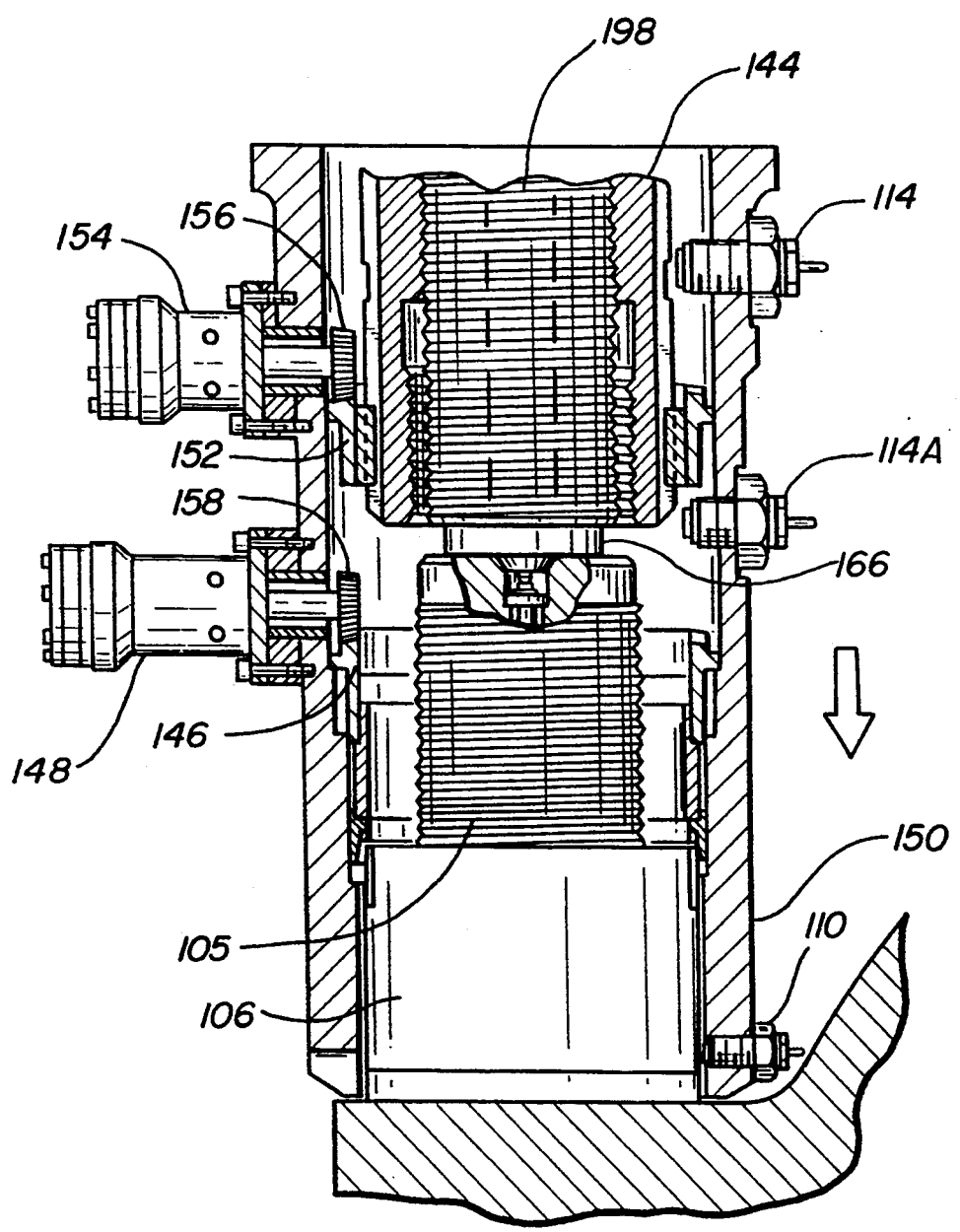
FIG. 12 shows sequence 3 of the tension engagement with the tensioner sitting on the flange surface, the puller bar socket disengaged from the stud and the nut drive gearing disengaged from the nut.
Figure 13:
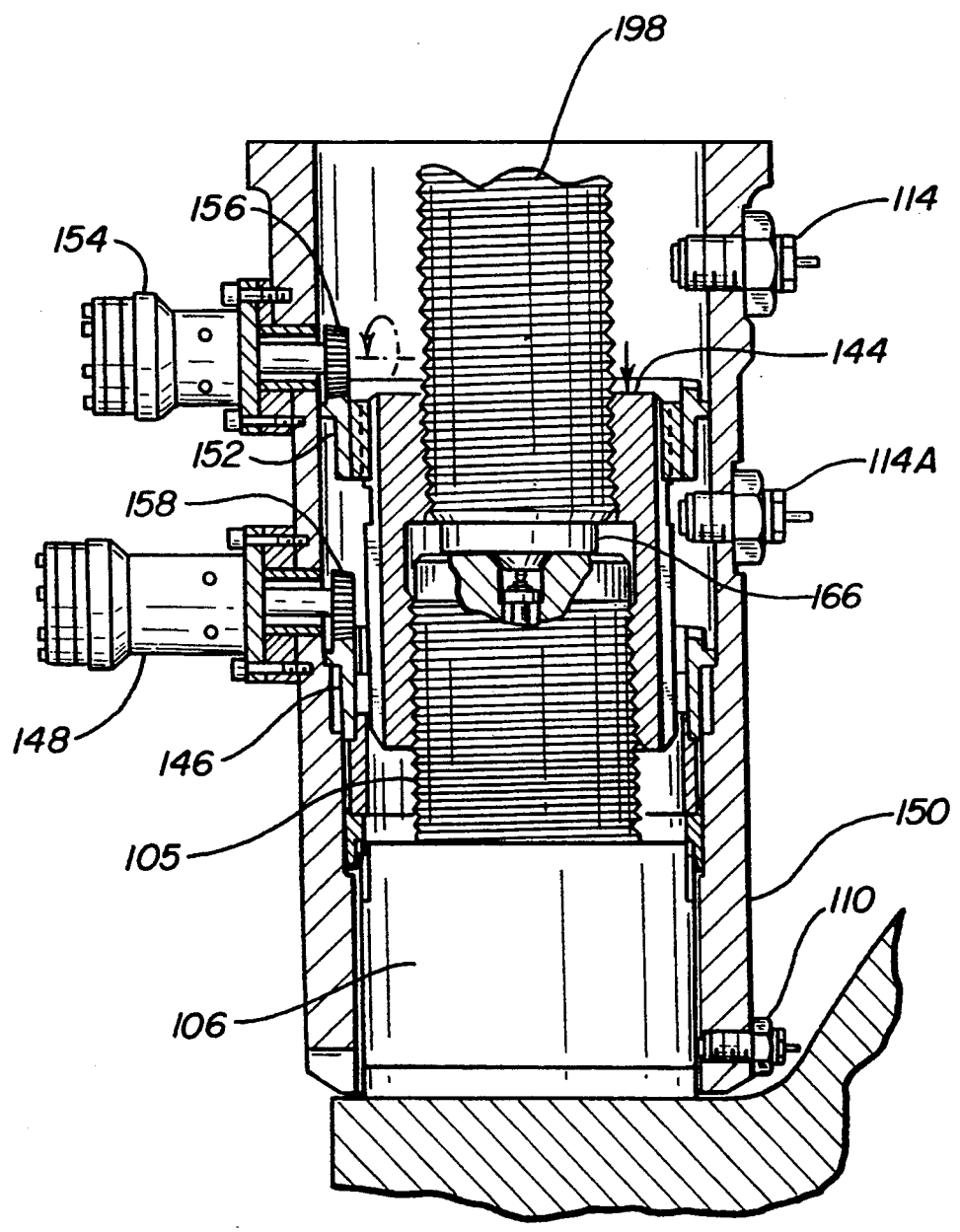
FIG. 13 shows sequence 4 of the tension engagement with the tensioner sitting on the flange surface, the puller bar socket engaged with the stud and the nut driving gear engaged with the nut.
Figure 14:
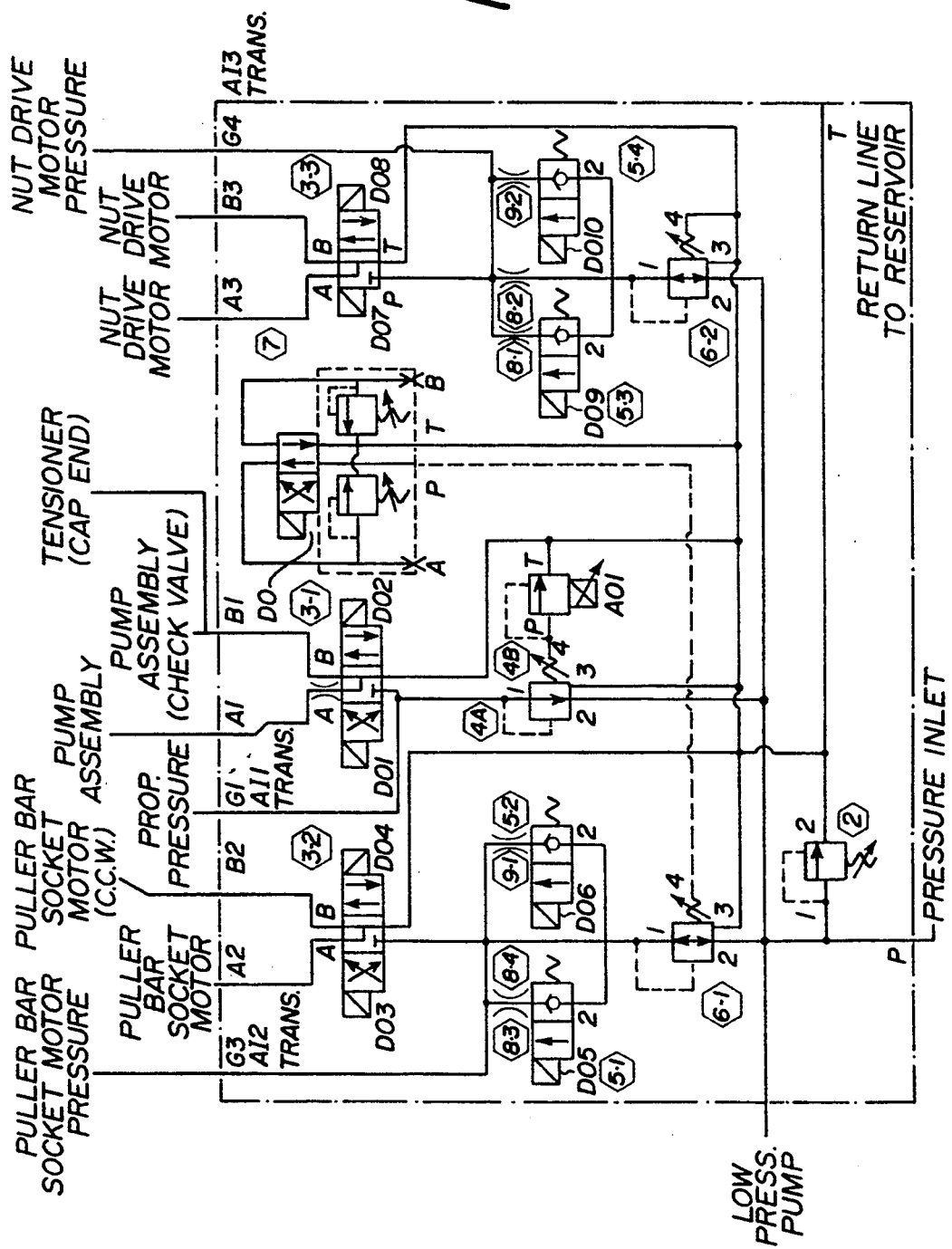
FIG. 14 shows a diagrammatic view of the circuitry used for automatically controlling the various components of the stud tensioner.
Figure 15:
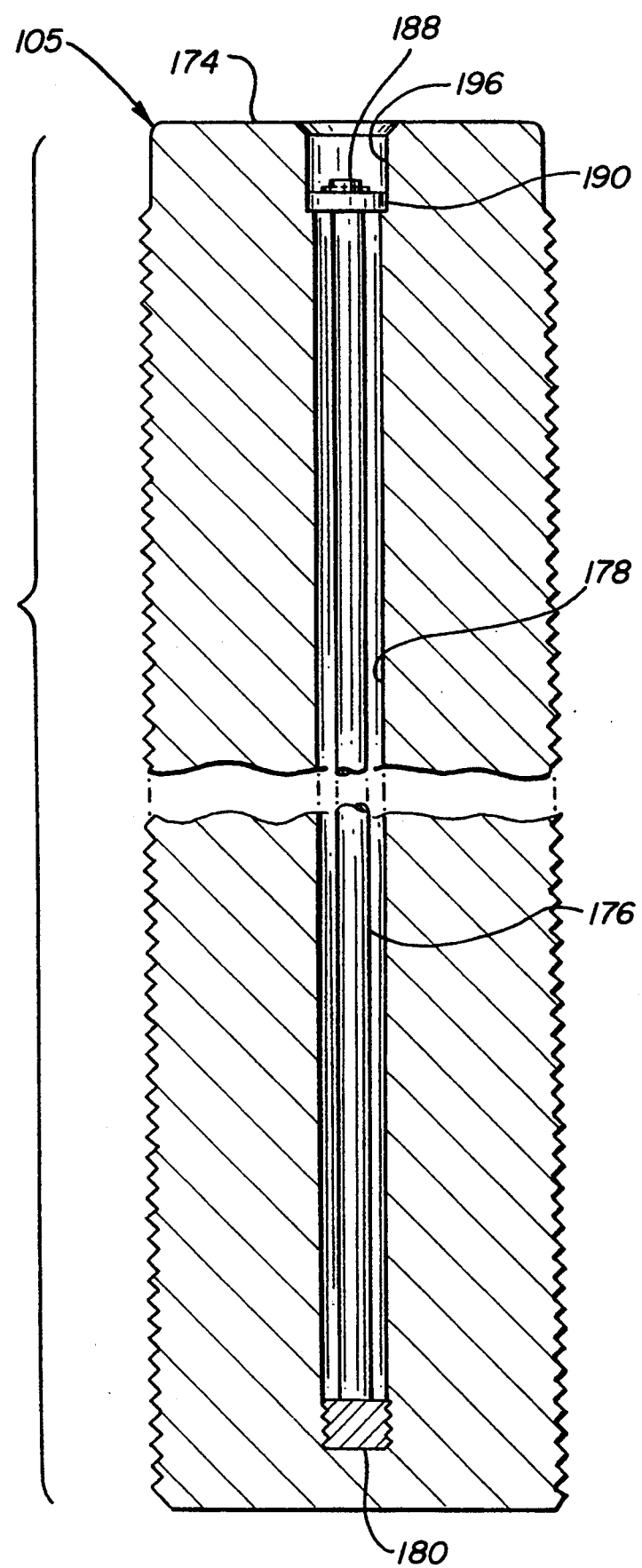
FIG. 15 shows the stud used in connection with the automatic tensioner system having a long bore and a relaxed rod mounted therein.
Figure 19:
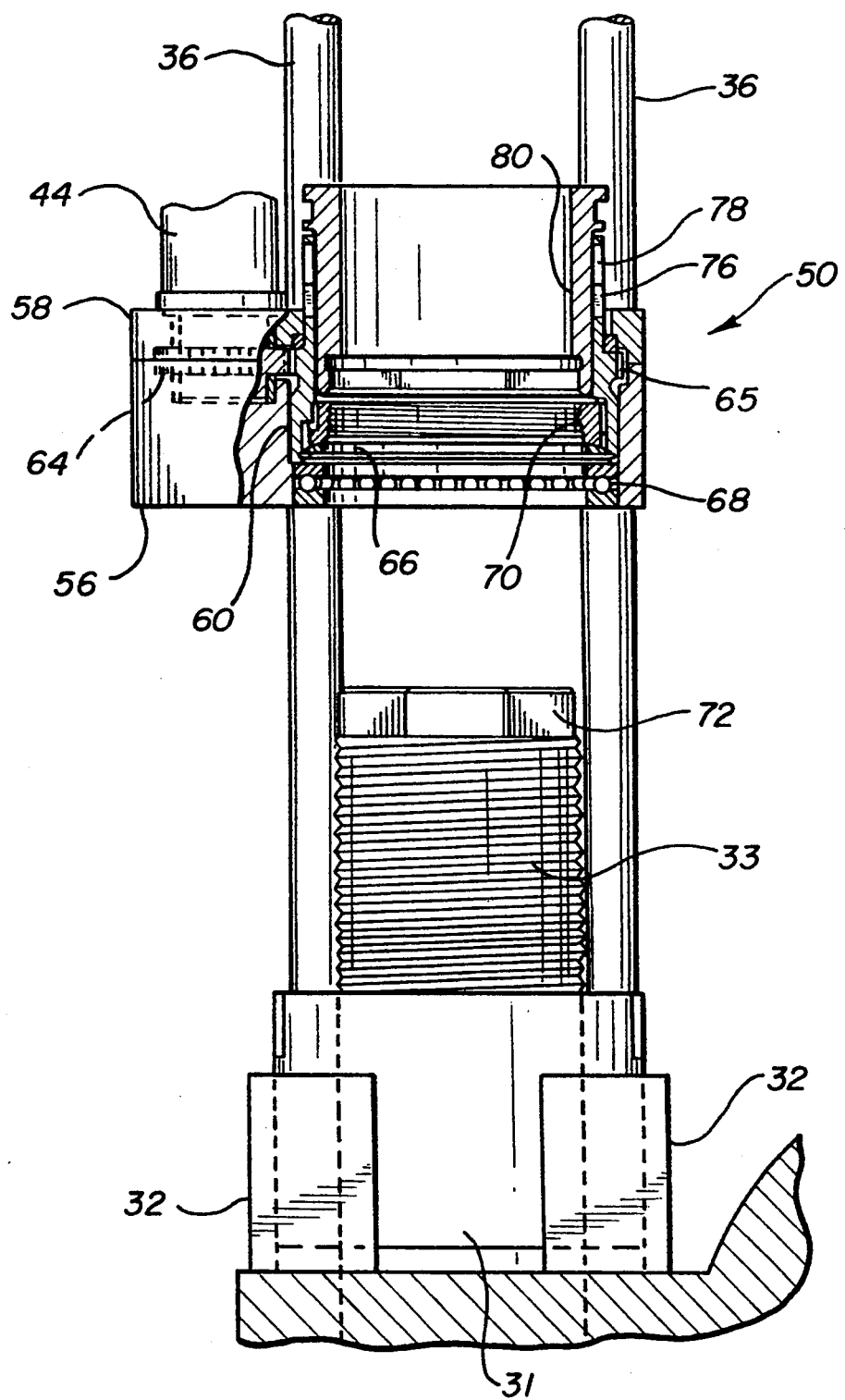
FIG. 19 is a first of a sequential schematic representation showing the stud insertion and removal tool mechanism engaged with sequence 1 showing the mechanism supported above the stud.
Figure 20:
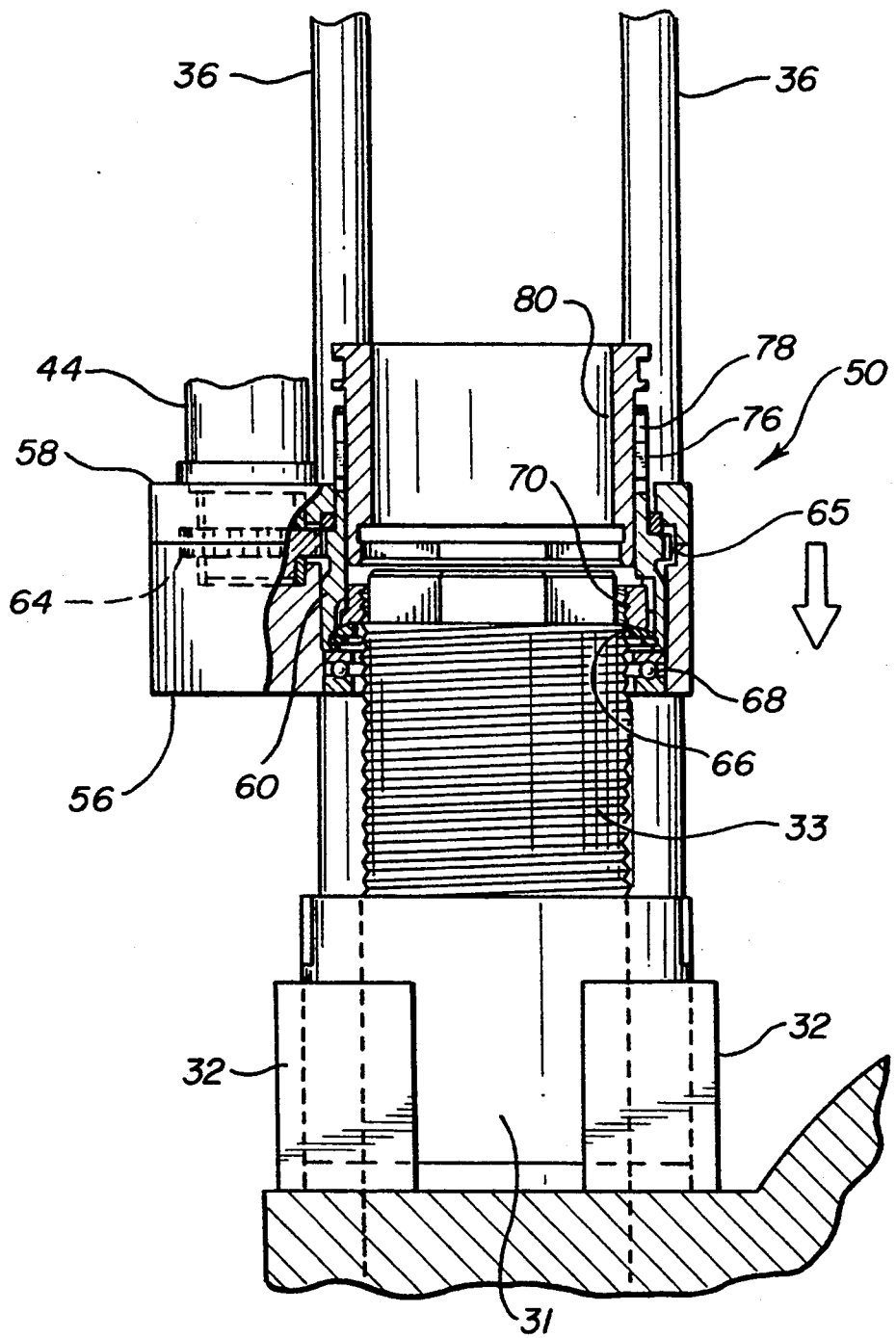
FIG. 20 shows the mechanism in FIG. 19 with the gripping coupling contacting the stud and the drive coupling disengaged.
Figure 21:
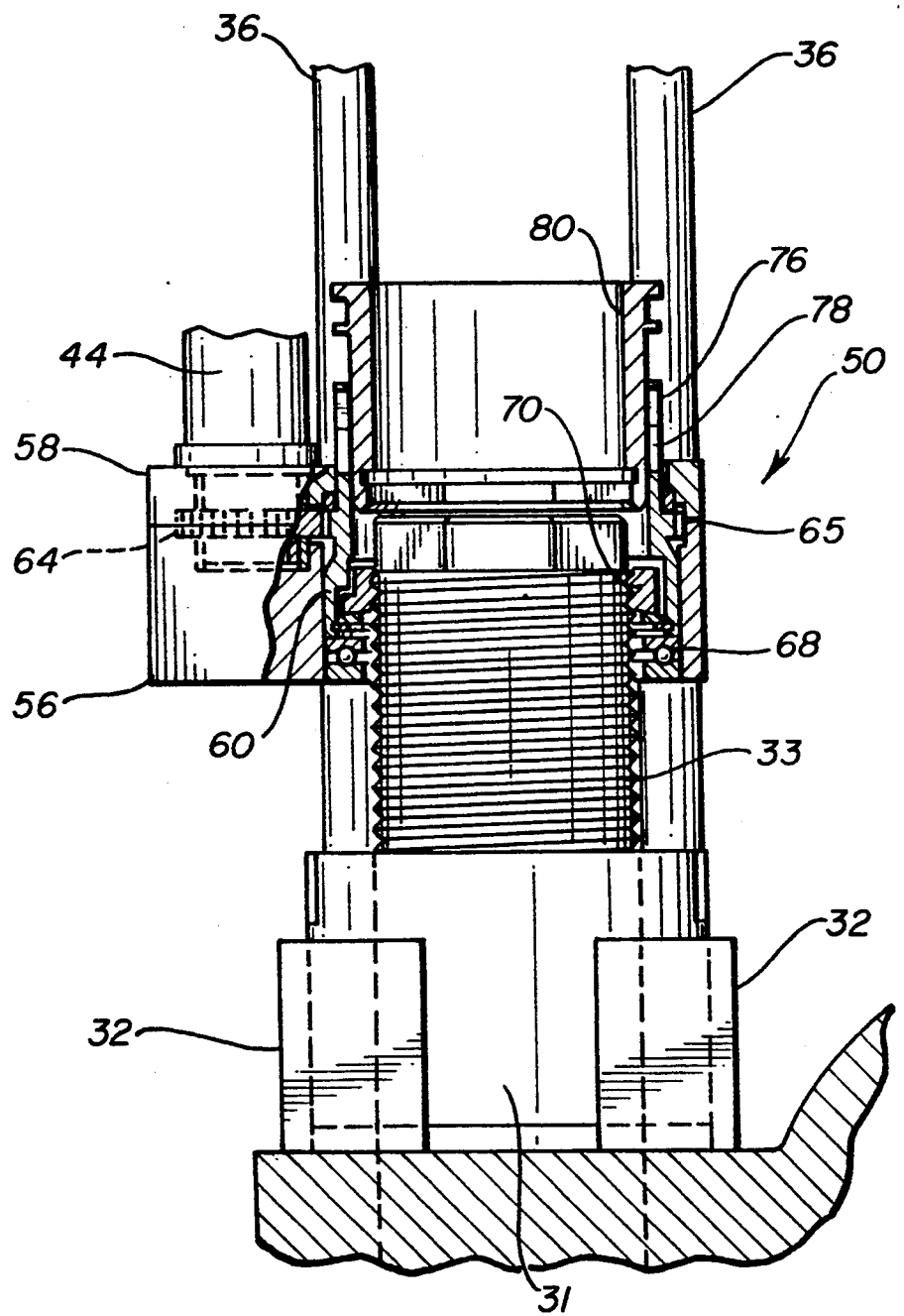
FIG. 21 shows the equipment shown in FIG. 19 with the gripping coupling engaged with the stud and the drive coupling disengaged.
Figure 22:
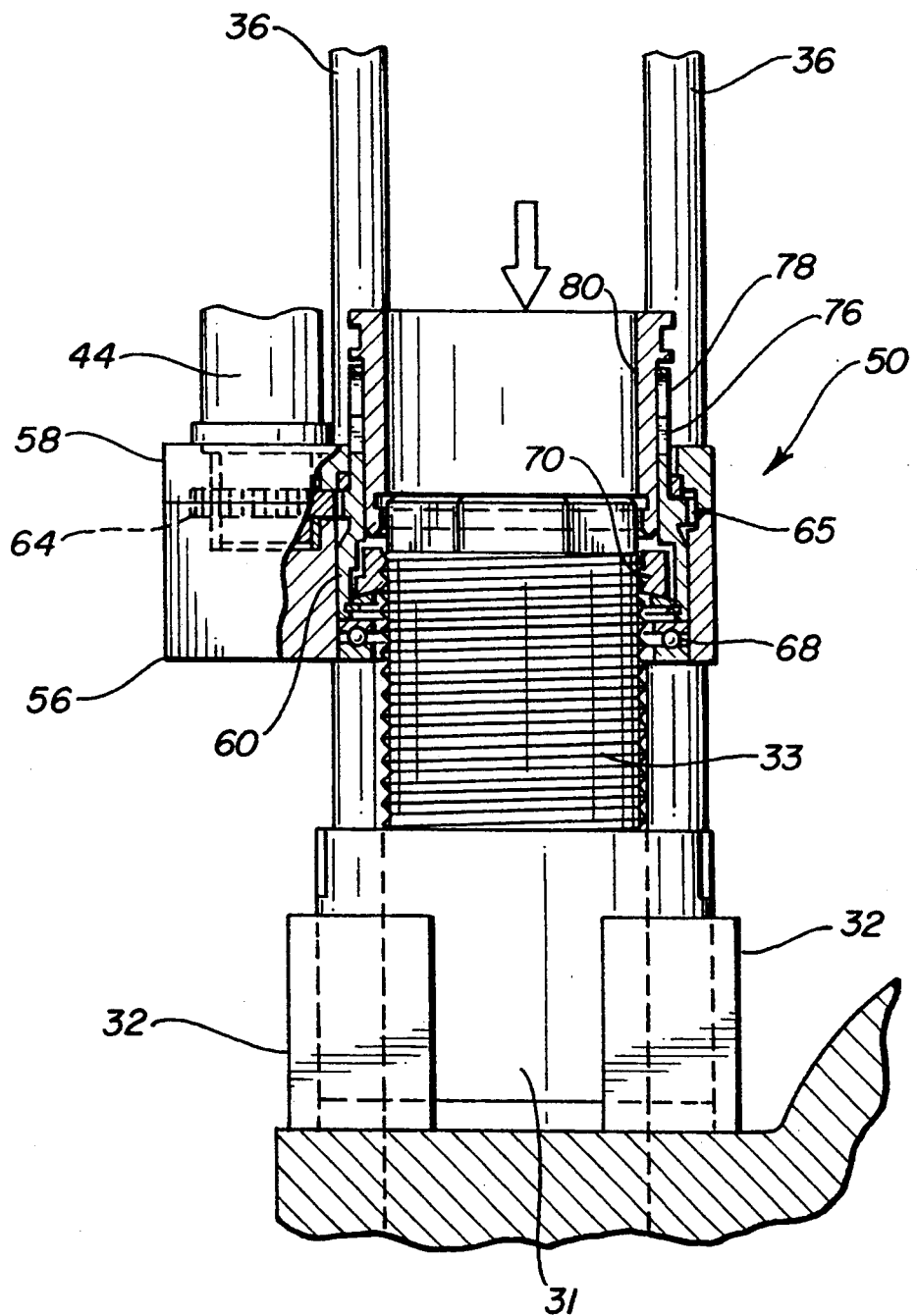
FIG. 22 shows the equipment shown in FIG. 19 with the gripping coupling and the drive coupling engaged with the stud, starting to unthread the stud from the vessel.
Figure 23:
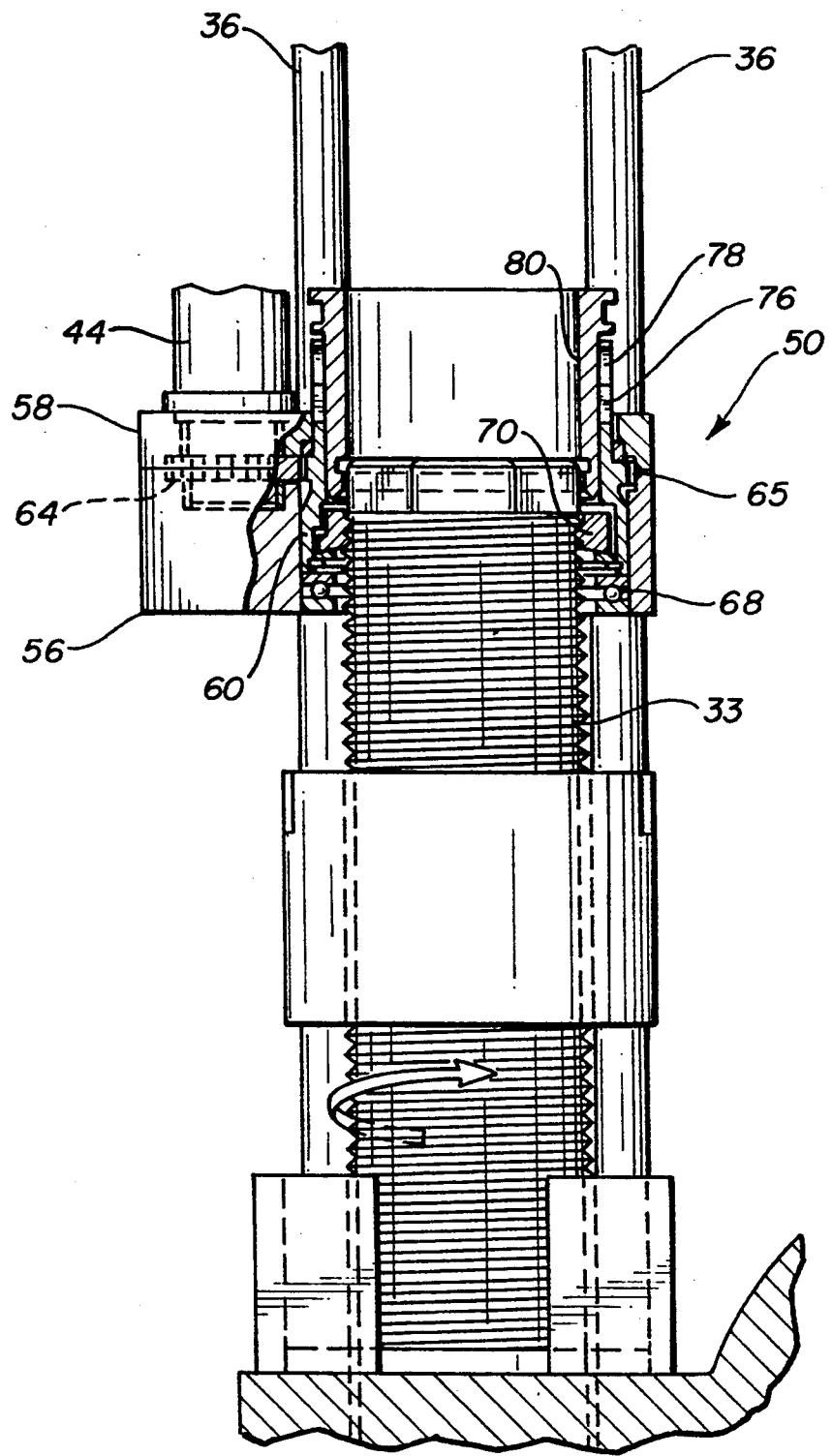
FIG. 23 shows the gripping coupling and the drive coupling engaged with the stud and the stud unthreaded from the vessel.
Figure 24:
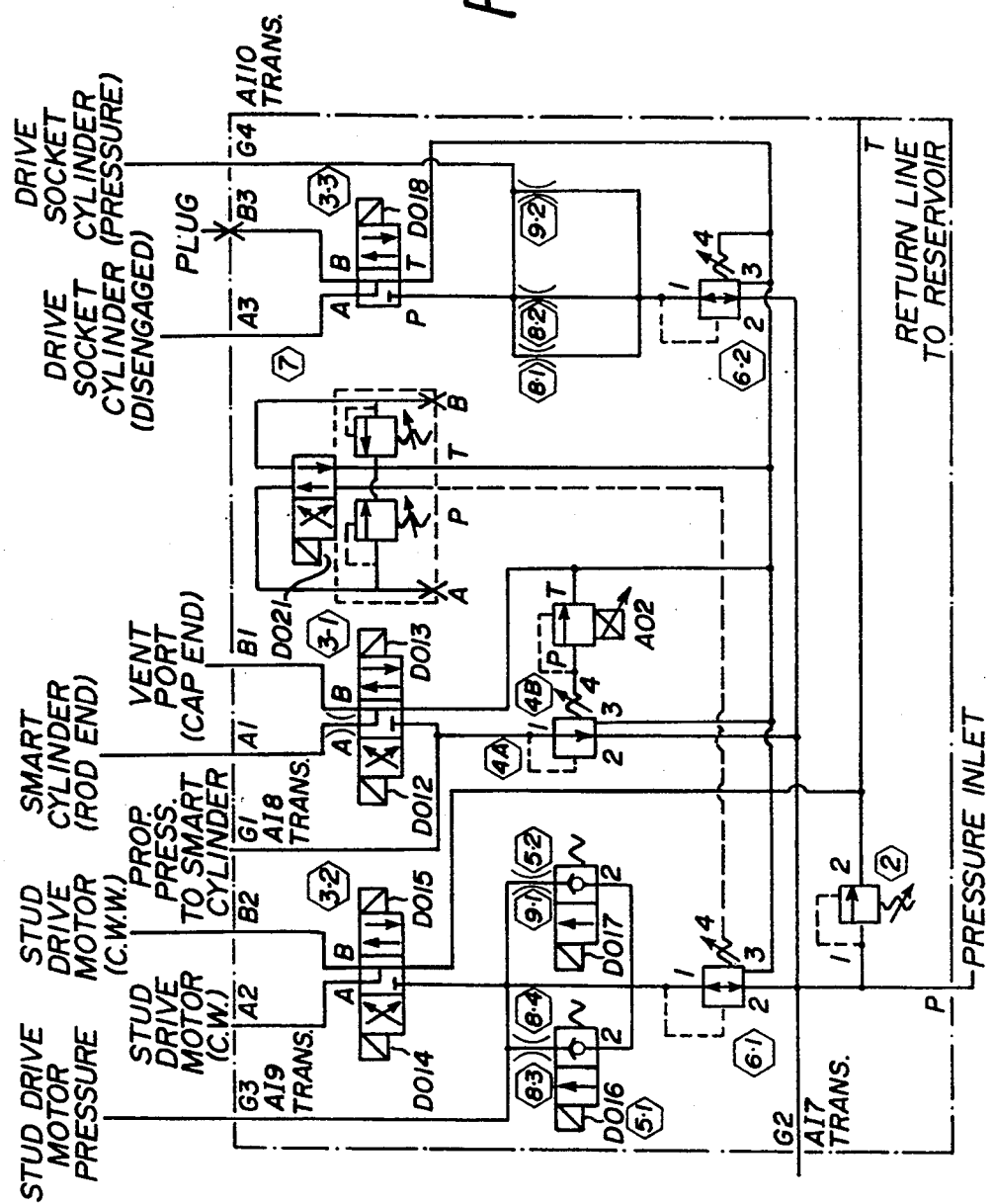
FIG. 24 is a schematic view of the fluid circuit used for actuating the various components of the stud insertion and removal tool.

An automatic remote stud tensioning and stud insertion and removal system for nuclear pressure vessels is shown schematically in FIGS. 1–4. A nuclear reactor generally indicated at 200 has a dome 202 with a standard flange 204 that is secured by a plurality of studs and nuts in a usual manner. The flange is covered a plurality of flange cover sectors 206. Each of which, in the preferred embodiment, take approximately one-sixth of the circumference of the flange and each of which have two posts 208 upon which apparatus sectors 224 will be mounted as to be discussed below. Each flange cover sector has a series of wheels 210 which allow the device to be rotated so that the flange cover sectors can be brought to the reactor from one point as for example by means of a hoist 212 and then rotated around to completely cover the circumference of the flange and are then connected by bolts or any other convenient fastening means to form a unitary ring on the flange.

A caddy, generally indicated at 216, includes a bottom portion 217 from which vertical posts 219 extend to support top rails 218. A gantry 220 is positioned on top of the caddy and it is powered by a motor 230 to move the gantry along the top rails 218 and motor 234 to raise and lower the apparatus sectors at the end of the gantry onto the flange.

The caddy has supports 222 which allow it to be moved up to the location of the flange where the apparatus sectors 224, mounted between the side rails in the caddy, are to be delivered by the gantry to the flange cover sector. The flange cover sectors are rotated around the flange sequentially to receive the appropriate apparatus whether tensioners 226 or stud insertion and removal tools 228. The flange cover sectors are rotated about the flange typically by pin gear means. The pin gear motor is mounted on the caddy, and the pin gear extends therefrom. The pins of the pin gear are received in slots extending peripherally about the flange cover sectors. Movement of the pin gear thereby causes a corresponding movement of the flange cover sectors.

By means of remotely controlled actuation, various motors 234, 230, and other motors not shown coact to move the appropriate apparatus sectors from caddy 216 onto the posts 208 of the flange cover sectors to support the appropriate apparatus whether they be stud insertion and removal tools 228 or stud tensioners 226 in the appropriate flange sector. After the appropriate apparatus whether it be stud tensioners or stud insertion and removal tools is positioned it is automatically actuated through the operating cycle by remote control as will be described hereinafter. Several operating cycles are necessary for the tools to operate on all studs on the flange. The apparatus sectors have tools positioned in such a manner as to operate on studs which are not contiguous. Therefore, after the tools on an apparatus sector operate on corresponding studs, the tools are raised by the ball screws or other convenient positioning means and the flange cover rotated an increment to enable the tools to operate on three other studs. The operation cycle is repeated until all of the studs on the flange have been processed by the appropriate tools as required.

After the appropriate servicing is conducted to the studs holding the dome of the pressure vessel, the tensioners and the stud insertion and removal tools can be removed and then the caddy can be withdrawn to allow for opening of the dome and servicing of the reactor.

The advantage of the system is clear in that it enables the reactor to be opened without any human intervention or with a minimum of human intervention by means of a remote control and operated tensioners and stud insertion and removal tools.

Referring to FIGS. 5-15 dealing with the stud tensioner, a stud tensioner generally indicated at 100 has a lower housing 150 that rests on the flange of a pressure vessel over the nut 106 of a stud generally indicated at 105. The tensioner incorporates and operates in many similar ways to the integral tensioner shown in U.S. Pat. No. 4,535,656 which shows an integral stud tensioner, and also U.S. Pat. No. 3,995,828 which shows in detail indicator measuring means for measuring the elongation of studs. Both of these patents are incorporated herein by reference.

The tensioner has an upper housing consisting of several units 140, within each unit there being disposed a piston 142. The pistons coact with each other, the lower pushing against the upper, to eventually push against the puller bar nut 118, which is fixed to the puller bar 198. The puller bar 198 is connected to the stud by means of a puller bar socket 144 which is intended to engage the threaded means at the top of the stud and to threadably engage the top of the puller bar.

The puller bar socket is brought into engagement with the top of the stud by means of a puller bar socket drive 152 which has a gear formed at the upper portion drive which in turn mates with the pinion gear 156 of the puller drive motor 154 located on the side of the tensioner. Actuation of the motor rotates the puller bar drive motor pinion to rotate the socket drive 152 which will cause the puller bar socket to rotate and threadably engage the top of the stud.

Once the puller bar, through its socket, is engaged and the hydraulic pumping system, generally indicated at 102, is actuated to provide hydraulic fluid through the hydraulic controls generally indicated at 104, hydraulic fluid will enter the top cylinder, pushing up top piston 142 and will then pass through the hydraulic connection 162 to pressurize the lower cylinder.

As the cylinders move upward against the puller bar nut 118, the force will be exerted through the puller bar coupling to the top of the stud, elongating the stud and allowing the stud nut 106 to be relaxed so that the nut drive motor 148 driving motor pinion gear 158 can contact the nut drive gear 146 which engages the top of the nut drive to rotate the nut and back it off.

There are several sensors in the system which coact with the hydraulic pumping system to automatically operate the stud tensioner. There is a nut sensor 110 which will indicate whether the stud nut has been backed off and to what extent. There are puller bar socket sensors 114 and 114A which senses the relative position of the puller bar socket and which can determine how far the puller bar has moved and whether the puller bar is in the proper position for operation. There are also overstroke and return piston sensors 115 and 115A which are positioned above the upper piston to indicate the relative activity of the piston.

An elongation measuring system is provided in the apparatus which automatically and accurately measures the elongation of the stud produced by the tensioner. It consists of several coacting parts. First, in the stud itself there is a relaxed rod generally indicated at 176 mounted in a bore 178 running almost the length of the stud. The construction is shown in detail in FIG. 15. The rod is mounted or resting on a plug 180 positioned in the bottom of the stud and extends through a locating annulus 190 to an end 188 an enlarged end bore 196 at the top of the stud 174. Thus, the end 188 of the relaxed rod 176 is held in position ready to contact an indicator rod that will be mounted in the puller bar to be described. Because the rod is relaxed, it will not be stretched in the same manner as will the stud, and will therefore provide an accurate indication of the true stretch of the stud. The true stretch can be obtained by comparing the end position of the end of the stud 174 with the position of the end of the relaxed rod 188.

The position of the end of the stud is determined by means of the linear variable differential transmitter generally indicated at 170, which is connected to an indicator rod 194 that in turn is mounted to a datum disk 172 positioned within a centering disk 166 located at the end of the puller bar. The centering disk 166 has a conical section which is intended to be aligned with the enlarged portion for the enlarged bore 196 of the stud. The end of the relaxed rod 188 therefore will be centered to meet the lower end of the indicator rod 194. To ensure that the indicator rod is positioned at the proper location with respect to the end of the relaxed rod 188, the datum disk 172 has a plurality of pins 182 which extend downward through the centering disk 166 and are urged downward by springs 184. They require compression of the springs in order to properly seat the pins on the top of the stud 174. Therefore because of the resilience offered by the springs, it is easy to determine whether there is any relative movement still available to the datum disk so that the position of the datum disk and therefore of the indicating rods can be easily and clearly established with respect to the top of the stud.

The indicator rod 194 is free to slide in order to contact the top of the end of the relaxed rod 176 and therefore moves the indicator rod 194 to deflect and produce a change in the linear variable differential transmitter 170. This movement is sensed in coaction with the datum sleeve 192 that extends and is connected to the datum disk 172 and that rides outside of the guide sleeve 186 that extends upward and threadably connected to the linear variable differential transmitter 170. In effect the difference of the change in relative distance between the end of the indicator rod 194 and the guide sleeve 186 is measured by the linear variable differential transmitter. The end of indicator rod 194 forms a plunger 195 which extends upward into a bore 197 in the bottom of the linear variable differential transmitter 170, so that the threaded portion 199 of linear variable differential transmitter 170 which is connected to guide sleeve 192 will be relatively stationary with respect to the plunger 195 which will be moving within bore 197 and therefore will be sensed by the linear variable differential transmitter 170.

The linear variable differential transmitter is connected to the hydraulic pumping system by appropriate circuitry and also connected to the hydraulic controls 104 to control the operation of the tensioner. Basically, the order of operation of the tensioner involves lowering the tensioner by means of a motor or any other suitable means by which the tensioner can be lifted with the apparatus sectors until the lower housing is positioned over the stud nut 106. The puller bar socket drive motor is then actuated to rotate the puller bar socket drive and therefore rotate the puller bar socket around the threaded portion at the upper end of the stud. Once firmly threadably engaged, as can be determined by sensor 114A the tension required for driving the puller bar drive motor, hydraulic pressure is applied to the pistons to tension the stud. When the linear variable differential transmitter or elongation measuring system, which can be generally referred to as 170, senses the appropriate degree of extension, sufficient to relax the stud nut 106, the nut drive motor can be actuated to rotate the nut drive gearing. This will back the nut away from the flange of the pressure vessel leaving the nut in a raised position and the stud relaxed.

The automatic equipment used to lower the tensioner can then be actuated to lift off the tensioner and to move the tensioner out of position over the end of the stud to then make way for the stud drive tool to back out the stud if needed.

Clearly the situation can be reversed if an when it is necessary to tension the stud and tighten the nut. In that case, the nut would first be backed down by the nut drive motor and puller bar and drive motor would be engaged to engage the puller bar to the stud, the pistons would then be actuated to tension the stud and then the nut would be further backed down with the stud in a tensioned condition. Then the puller bar drive motor would be backed off to disengage the puller bar socket from the stud and the tensioner would be removed from the vicinity of the stud.

The stud insertion and removal tool shown in FIGS. 16–24 is indicated generally at 30 and comprises a stud insertion and removal tool base plate 32 connected by means of primary or outer tie rods 36 to a primary platform 34. The stud insertion and removal tool is shown and discussed in more detail in previously issued U.S. Pat. No. 4,548,103 issued Oct. 22, 1985 the entire contents of which are incorporated herein by reference.

The stud insertion and removal tool assembly fits around a reactor pressure vessel stud 33 having a nut 31 positioned at its base. On the primary platform 34 is mounted a hydraulic pumping system, shown schematically in FIG. 24, for the entire unit 48 which is used for various functions to be herein described. A hydraulic lift cylinder 46 is mounted on the primary platform 34 and is connected to a tertiary or third drive platform 41. A drive actuating cylinder 42 mounted on the secondary drive platform 38 is connected through the third drive platform 41 and is used to actuate part of the stud gripping mechanism generally indicated at 50 which is mounted on one of the outer tie rods 36. The stud gripping mechanism 50 has a gripping motor 44 which is controlled by means of hydraulic controls 45 mounted on the primary platform 34. The secondary drive platform 38 is connected to the third drive platform and stabilizes the third drive platform 41 by a series of inner tie rods 40.

It should be noted that the third drive platform 41 is larger than the secondary drive platform 38 so that the secondary drive platform 38 can fit above the third drive platform 41 and within the confines of the outer tie rods 36.

The stud gripping mechanism 50 consists of basically a housing, generally indicated at 54, having a lower section 56 and an upper section 58. The gripping motor 44 is mounted on the upper section 58 and has a drive shaft 62 extending down into the lower section 56 to drive a drive gear 64. Drive gear 64 engages driven gear 65 which is part of drive sleeve 60 so as to turn the entire drive sleeve 60.

Figure 25:
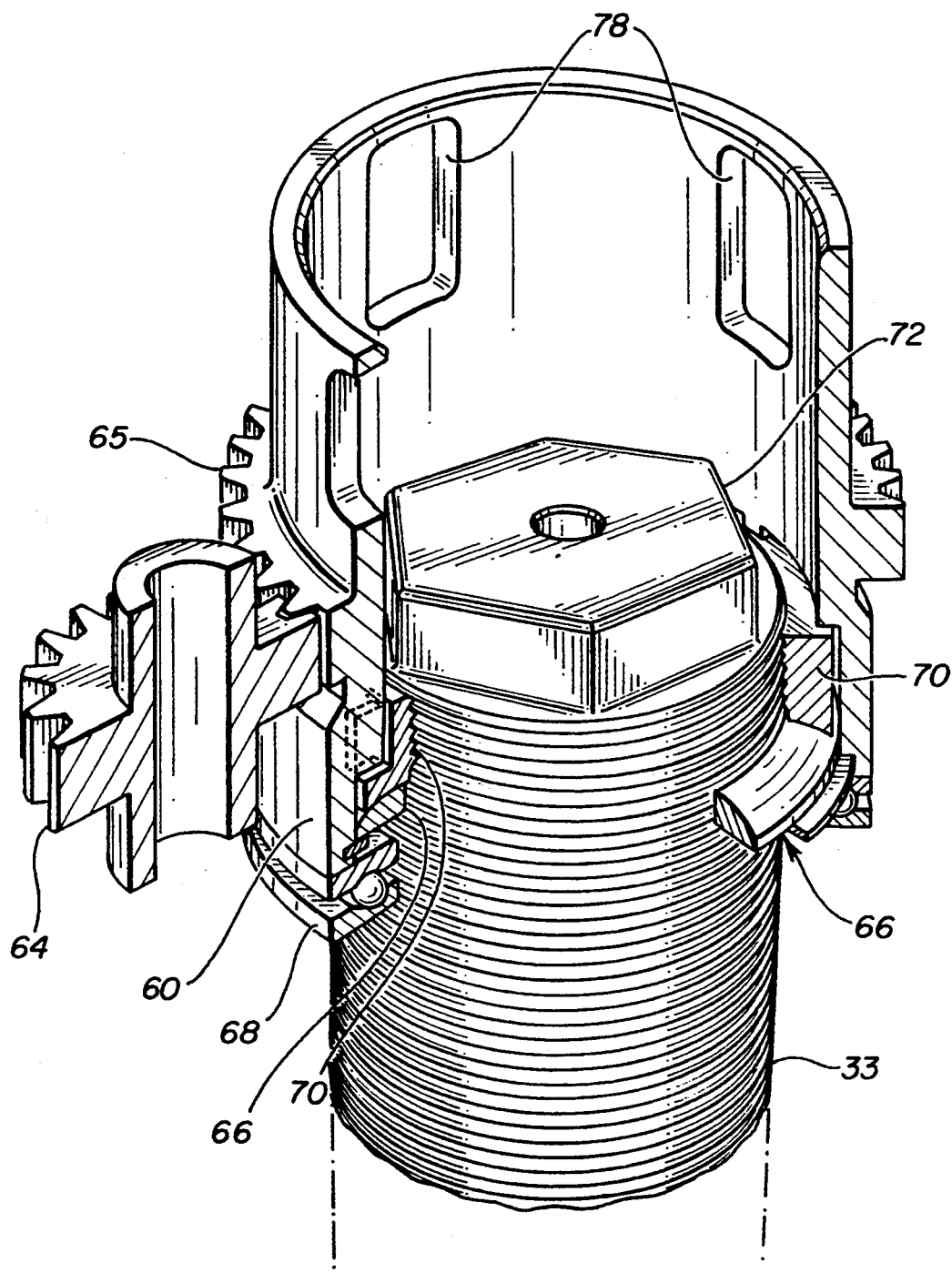
FIG. 25 is a perspective view, partially cut-away, showing the drive sleeve and the stud.

Drive sleeve 60, shown in detail in FIG. 25, is connected to a gripping coupling 70 adapted to fit about and engage the thread of stud 33 at the upper end of the stud. Within the gripping coupling 70 is a gripping ring 66 made of aluminum, copper or other soft metal so that the entire stud gripping mechanism 50 can be lowered down and around the threads at the top of the stud 33 to engage the threads and align the threads of the gripping coupling 70 with the threads of the stud without damaging the threads of the stud.

Above the gripping coupling 70 is a drive coupling 80 partially extending down into the stud gripping mechanism 50 and held by drive coupling retaining means 82 in the form of fingers which are connected to the third platform 41 and extend into an annular groove 74 in the outside of the drive coupling 80. The drive coupling 80 has a key 76 which extends outwardly from the outer wall of the drive coupling 80 through a slot 78 in the drive sleeve 60. This allows the drive coupling to be raised or lowered with respect to the drive sleeve 60 upon actuation of the drive actuating cylinder 42.

The device operates as shown in FIGS. 19–23. When it is desired to remove or insert a stud, the nut for the stud must be in a backed off position. If the stud is to be removed, the stud insertion and removal tool 30 is placed over the stud by means of a motor, and the stud drive tool is lowered until the base plate 32 is firmly seated on top of the pressure vessel flange and the outer tie rods 36 surround the stud. The hydraulic cylinder 46 for the third drive platform is in a position so that there is no force acting downwardly or upwardly on the stud or the gripping mechanism. The hydraulic lift cylinder can be manipulated to raise and then lower the gripping mechanism until the gripping ring contacts the threads of the stud to properly align the gripping mechanism so that the threads of the gripping coupling 70 can then threadably engage the threads of the stud. The gripping motor 44 is then actuated to rotate the drive sleeve 60 via the drive gear 64 and driven gear 65 formed on the outside of the drive sleeve. The drive sleeve will thereby screw the gripping coupling onto the threads of the stud. The hydraulic cylinder 46 for the drive platform will compensate for the space and automatically move the platform down. Once the gripping coupling 70 has fully engaged the threads at the top of the stud, the stud can be backed off by actuating the drive actuating cylinder 42 to push the third drive platform 41 down towards the top of the stud so that the drive coupling 80 will engage with the driving means in the form of hex engaging means 72 formed at the top of the stud. The drive coupling 80 moves within the stud gripping mechanism because of the slot 78 in the drive sleeve and the key 76, which rides in the slot. Once the drive coupling is engaged with the engaging means, the entire system is locked in place and then once again gripping motor 44 driving external drive gear 64 on the drive sleeve 60 can be used to rotate the entire stud to back the stud off from the pressure vessel.

To disengage the stud drive tool, the drive actuating cylinder is actuated to bring the drive coupling out of engagement with the hex engaging on top of the stud. The gripping coupling can then be rotated using the external driven gear on the drive sleeve to unthread the drive tool from the threads of the stud and then the stud driver can be hoisted away.

While the drive coupling is rotating to back off the stud, it is supported at top by the coupling retaining fingers 82 which are located in the annular groove 74 and by a thrust bearing 68 positioned in the bottom of the lower section 56 of the housing.

It will be understood that various changes in the details, materials, arrangements of parts and operating conditions which have been herein described and illustrated in order to explain the nature of the invention may be made by those skilled in the art within the principles and scope of the invention.

We claim:

1. An elongation measuring system for tensioned studs comprising:
   a housing in a fixed position on and disposed about a stud and a nut;
   a nut socket within the housing adapted to engage the top of the nut;
   a puller bar;
   a puller bar socket within the housing adapted to threadably engage the top of a stud;
   a stud nut drive motor connected to the housing;
   a stud nut drive gearing connected through the stud nut drive motor, the stud nut socket being adapted for rotating the stud nut;
   a puller bar drive motor connected to the housing, the puller bar socket drive connected to the puller bar drive motor, and to the puller bar socket, to rotate the puller bar socket with the rotation of the puller bar drive motor, to threadably engage the puller bar socket with a stud;
   a piston means and cylinder means disposed in the upper portion of the housing;
   a puller bar nut connected to the top of the puller bar, the puller bar nut adapted to be urged upward by the piston means to tension the stud when said stud is attached to the puller bar through the puller bar socket;
   hydraulic control means mounted on the tensioner, said control means coacting with said hydraulic pumping means, said piston means and said nut drive motor means and said puller bar drive motor means to control the puller by said tensioner;
   piston sensor means comprising puller bar socket sensor means and nut sensor means disposed in said housing to sense the position of said pistons, said puller socket, and said nut and to coact with said hydraulic pumping system;
   elongation measuring system means comprising a centering disk disposed at the bottom of said puller bar and a datum disk disposed above said centering disk;
   pin means extended from said datum disk through said centering means adapted to contact the end of a stud to be tensioned;
   resilient means connected to said pin means to urge said pin means into the extended position;
   indicating rod means extending from and through said datum disk to a linear variable differential transmitter;
   a datum sleeve connected to said datum disk;
   said datum sleeve and said indicator rod coacting with said linear variable differential transmitter to indicate the position of said tensioner.

2. The apparatus of claim 1 wherein the stud nut drive gearing includes a pinion gear driven by the stud nut drive motor, the pinion gear coacting with the nut socket to rotate the nut.

3. An automated stud tensioner comprising:
   lower housing means adapted to be positioned on and disposed about a stud and a nut;
   upper housing means having a plurality of units;
   cylinder means positioned between each of the plurality of units for separating the units to elongate the upper housing means;
   puller bar means extending from the upper housing means for engaging a stud;
   puller bar nut means for supporting the puller bar means at an upper unit of one of the plurality of units of the upper housing;
   puller bar socket means extending from the puller bar means for engaging a stud;
   puller bar socket drive means on the upper housing means for driving the puller bar socket means to threadibly engage a stud;
   hydraulic pressure means on the upper housing for pressurizing the cylinders in the upper housing to exert a force on the puller bar to elongate a stud;
   nut drive means on the lower housing for driving a nut on a stud to tighten or loosen the nut;
   nut sensor means on the lower housing for sensing the position of the nut;
   puller bar sensor means on the lower housing for sensing the position of the puller bar; and
   stud elongation mounted within the puller bar means measuring means for measuring the elongation of the stud.

4. The apparatus of claim 3 wherein the nut drive means includes a pinion gear driven by a nut drive motor.

5. The apparatus of claim 4 wherein the stud elongation measuring means comprises:
   a bore extending within a stud;
   a relaxed rod fixed in the bore at one end;
   a locating annulus positioned within a stud for receiving and positioning the relaxed rod;
   an indicator rod extending from within the puller bar means contacting the relaxed rod and moveable with the relaxed rod; and
   a variable differential transmitter fixedly positioned within the housing for receiving the indicator rod for measuring movement of the indicator rod, and the elongation of a stud.

6. An automated stud tensioner comprising:
   a housing extending about a stud and nut;
   positioning means for positioning the housing about a stud and a nut;
   puller bar means extending from the housing for engaging a stud;
   drive means on the housing for driving the puller bar means to attach the puller bar to a stud;
   hydraulic means on the housing for exerting a force on the puller bar to elongate a stud; and
   stud elongation measuring means interconnected with the puller bar means for measuring the elongation of the stud.

7. The apparatus of claim 6 wherein the upper housing includes a plurality units separated by cylinders to permit elongation of the upper housing.

8. The apparatus of claim 7 wherein the nut drive means includes a pinion gear driven by a nut drive motor.

9. The apparatus of claim 8 wherein the stud elongation measuring means comprises:
   a bore extending within a stud;
   a relaxed rod fixed in the bore at one end;
   a locating annulus positioned within a stud for receiving and positioning the relaxed rod;
   an indicator rod extending from within the puller bar means contacting the relaxed rod and moveable with the relaxed rod; and
   a variable differential transmitter fixedly positioned within the housing for receiving the indicator rod for measuring movement of the indicator rod, and the elongation of a stud.

10. A stud elongation measuring apparatus comprising:
   a stud;
   a bore extending within the stud;
   a relaxed rod fixed in the bore at one end;
   locating means for the relaxed rod to coact with an indicator rod;
   a variable differential transmitter fixedly positioned in relation to the top of the stud;
   a datum disk positioned at the top of said stud in the end of said bore;
   a datum sleeve fixedly connecting said datum disk to said variable differential transmitter;
   an indicator rod extending from the variable differential transmitter through said datum sleeve and said datum disk and coacting with the relaxed rod to measure the elongation of the stud.

* * * * *